United States Patent
Kawakami

(10) Patent No.: US 8,229,173 B2
(45) Date of Patent: Jul. 24, 2012

(54) ANALYZER

(75) Inventor: Yuichi Kawakami, Nishinomiya (JP)

(73) Assignee: Konica Minolta Holdings, Inc. (JP)

( * ) Notice: Subject to any disclaimer, the term of this patent is extended or adjusted under 35 U.S.C. 154(b) by 986 days.

(21) Appl. No.: 12/208,501

(22) Filed: Sep. 11, 2008

(65) Prior Publication Data

US 2009/0195774 A1  Aug. 6, 2009

(30) Foreign Application Priority Data

Jan. 31, 2008  (JP) .................................. 2008-021950

(51) Int. Cl.
*G06K 9/00* (2006.01)
(52) U.S. Cl. ....................................................... 382/107
(58) Field of Classification Search .................. None
See application file for complete search history.

(56) References Cited

U.S. PATENT DOCUMENTS

| 2008/0136612 A1* | 6/2008 | Machii et al. | 340/435 |
| 2008/0166024 A1* | 7/2008 | Iketani | 382/107 |

FOREIGN PATENT DOCUMENTS

| JP | 04-138579 A | 5/1992 |
| JP | 2004-258900 A | 9/2004 |
| JP | 2006-53755 A | 2/2006 |
| WO | 2004/008744 A1 | 1/2004 |

OTHER PUBLICATIONS

Yang Fan; Balasuriya, A.; , "Optical flow based speed estimation in AUV target tracking," Oceans, 2001. MTS/IEEE Conference and Exhibition , vol. 4, no., pp. 2377-2382 vol. 4, 2001.*
P. H. Batavia, D. A. Pomerleau, and C. E. Thrope, "Overtaking vehicle detection using implicit optical flow," in Proc. IEEE ITS Conf '97.*
Mohammad Abdul Muquit, Takuma Shibahara, and Takafumi Aoki. 2006. A High-Accuracy Passive 3D Measurement System Using Phase-Based Image Matching. IEICE Trans. Fundam. Electron. Commun. Comput. Sci. E89-A, 3 (Mar. 2006), 686-697.*
K. Kanaya, "Understanding Images—Mathematical Principle of 3D Recognition", par. 5.3 Three-Dimensional Analysis of Planar Optical Flow, Morikita Publishing Co., Ltd., 1st Edition, May 24, 1990, pp. 123-128; and its English translation.
Japanese Office Action, Notice of Reasons for Rejection for Japanese Patent Application No. 2008-021950 mailing date of Jan. 17, 2012 with English Translation.

* cited by examiner

*Primary Examiner* — Bhavesh Mehta
*Assistant Examiner* — Nirav G Patel
(74) *Attorney, Agent, or Firm* — Cantor Colburn LLP

(57) ABSTRACT

A parallax calculator sets a plurality of target points in each standard image and calculates parallaxes of the individual target points. An optical flow calculator calculates two-dimensional optical flows of the individual target points by searching for points corresponding to the target points set in the standard image captured in a frame immediately preceding a current frame. A movement calculation block calculates a forward moving speed of the moving body and angular velocities thereof in both a pitch direction and a pan direction.

20 Claims, 23 Drawing Sheets

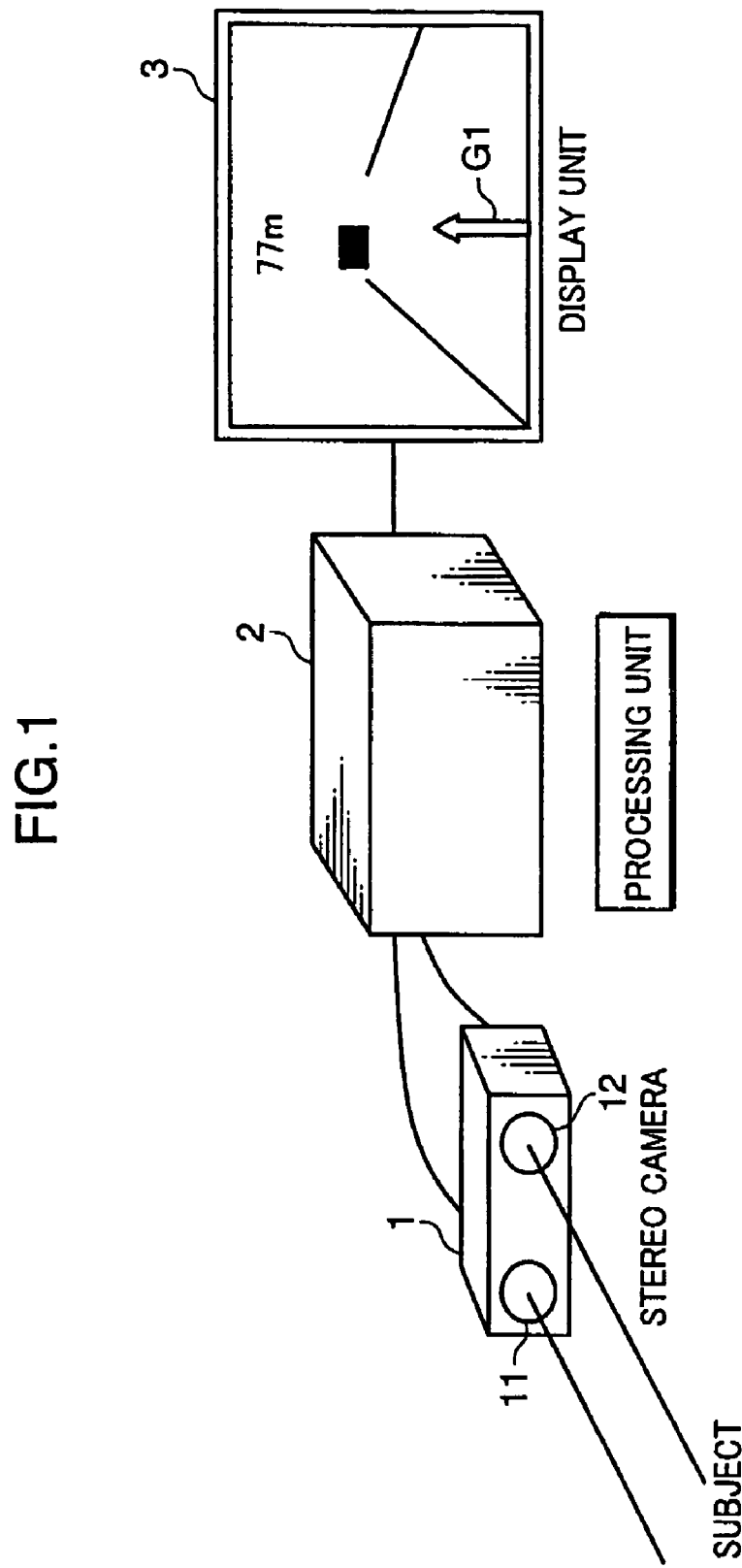

FIG.5
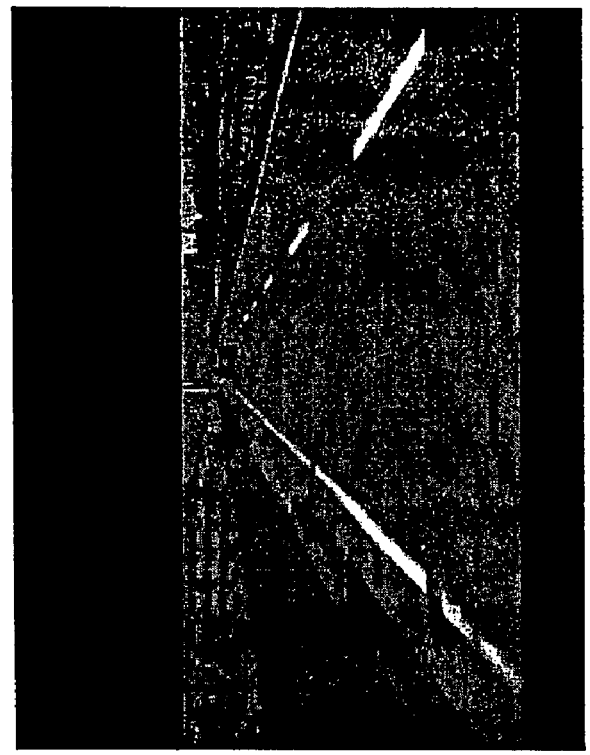
REFERENCE IMAGE
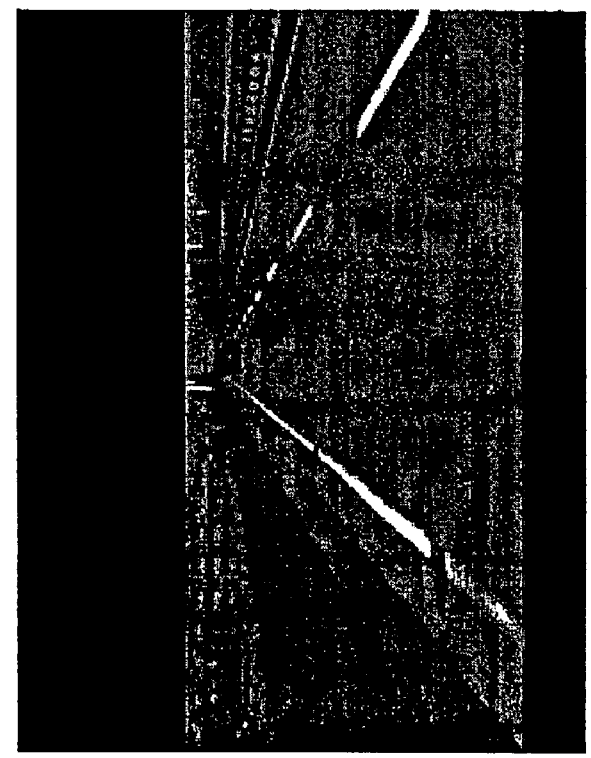
STANDARD IMAGE

CENTER OF IMAGE

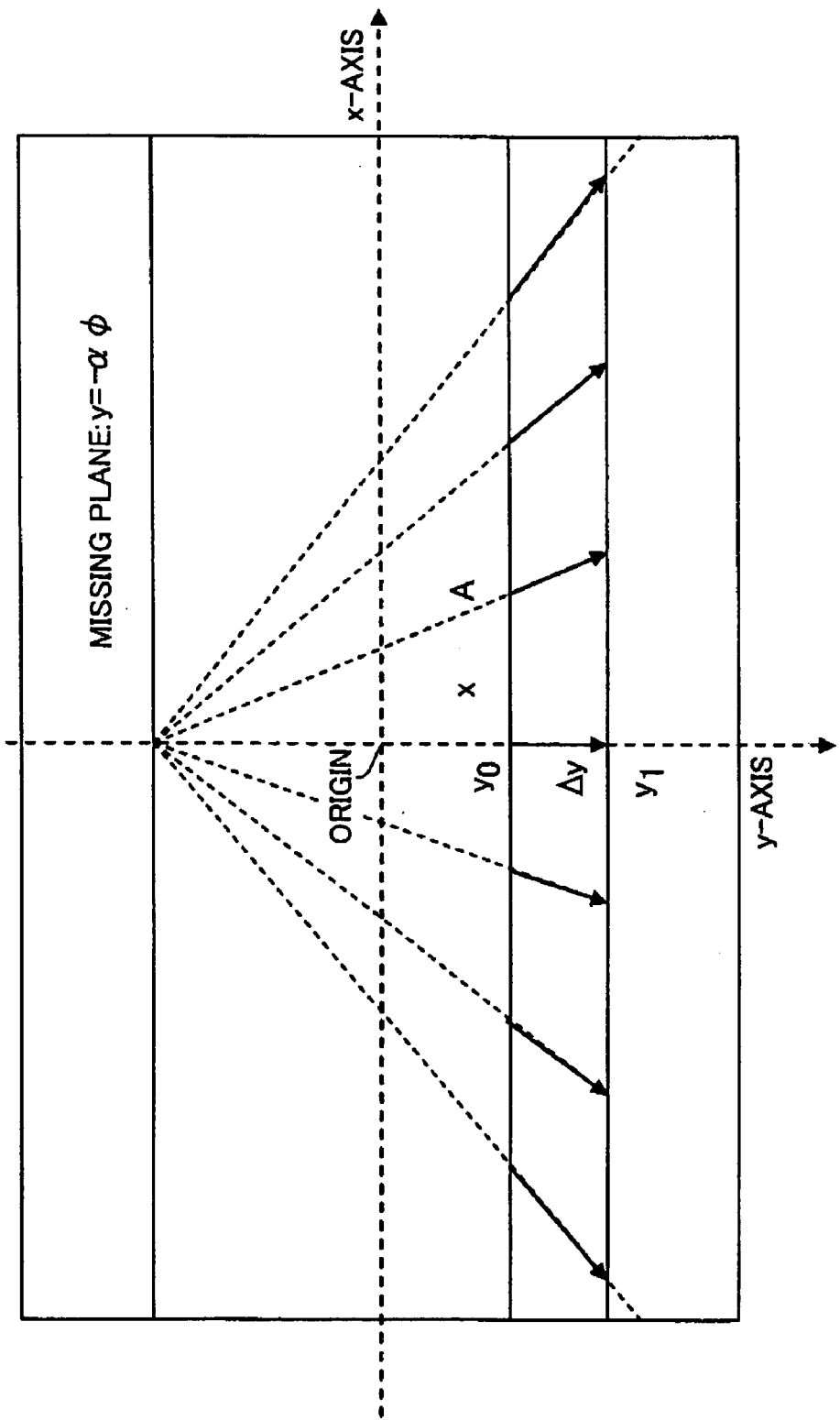

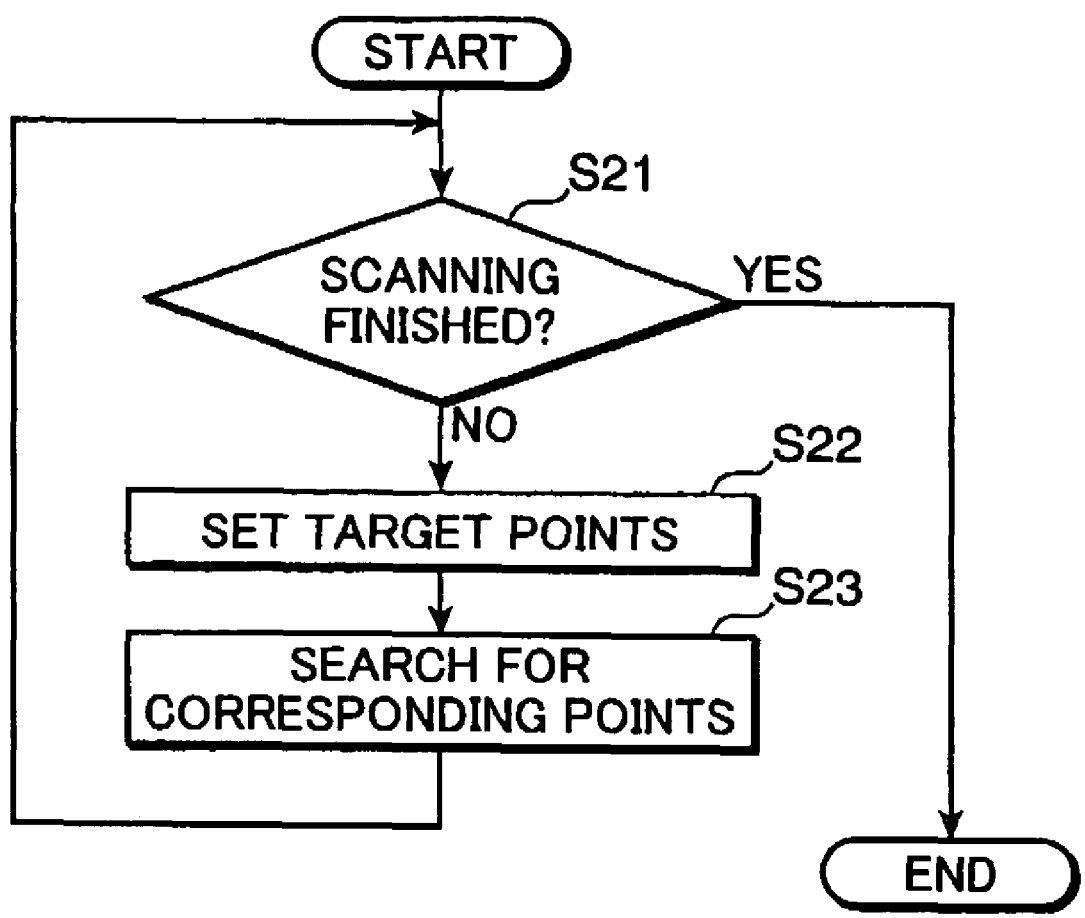

STANDARD IMAGE

REFERENCE IMAGE

STANDARD IMAGE

REFERENCE IMAGE

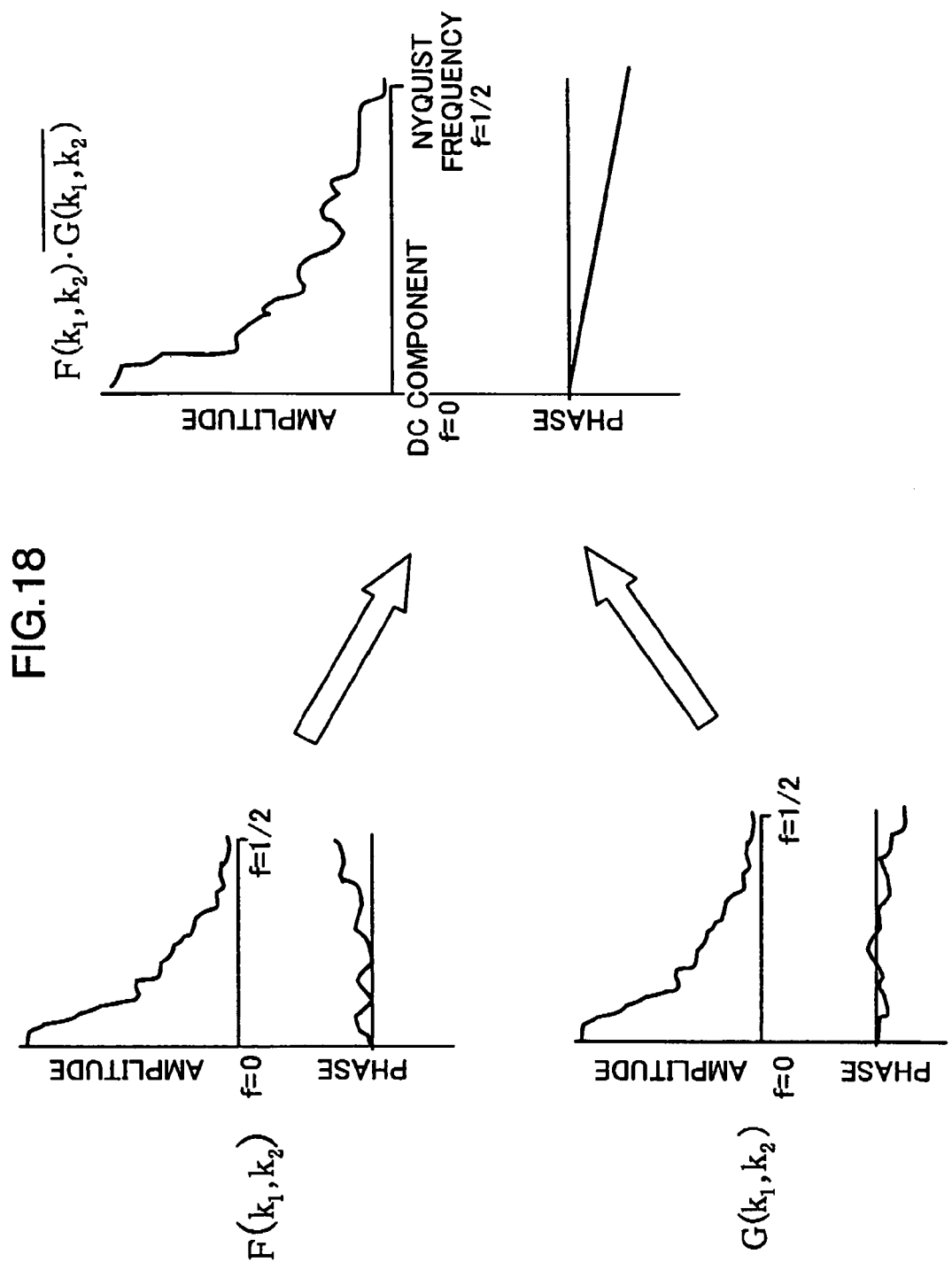

ANALYZER

This application is based on Japanese Patent Application No. 2008-021950 filed on Jan. 31, 2008, the contents of which are hereby incorporated by reference.

BACKGROUND OF THE INVENTION

1. Field of the Invention

The present invention relates to an analyzer configured to be installed on a moving body (vehicle) for analyzing motion of the moving body.

2. Description of the Related Art

Aiming at preventing traffic accidents, driving support systems using a stereo camera or a radar are actively studied nowadays. A driving support system installed on a vehicle searches for obstacles existing in a moving direction of the vehicle. Upon detecting an obstacle, the system measures the distance to the obstacle, judges whether the obstacle is threatening the vehicle, and if so, produces a warning to a driver or actuates brakes in a controlled fashion. The driving support system also analyzes relative motion of the vehicle and the obstacle. This analysis could provide information on driving habits, or personal behavior, of the driver, and results of the analysis may be effectively used for cautioning the driver or for reeducating the driver. Another possible application of the driving support system would be to use the same for scrutinizing vehicle motion in a traffic accident by analyzing images recorded by a so-called drive recorder.

In particular, the driving support system combined with a stereo camera offers a remarkable advantage which the driving support system combined with a radar can not offer in that the former makes it possible to identify the obstacle by processing recorded images.

Japanese Unexamined Patent Publication No. 2006-53755 proposes a technique for determining a distance traveled by a vehicle by determining road surface parameters from stereo images, producing time-sequential bird's eye views and matching the obtained bird's eye views with standard or reference images. A non-patent document, entitled "Understanding Images—Mathematical Principle of 3D Recognition," K. Kanaya, par. 5. Three-dimensional Analysis of 3-plane Optical Flow, p 123, introduces a technique for analyzing motion of a moving body without working out three-dimensional information but with the need for plan-view area information to be given in advance.

The technique of the aforementioned Patent Publication calculates the traveled distance by producing bird's eye views, and a later-described processing method of the present invention completely differs from this conventional approach of the Publication. Also, the technique of the aforementioned non-patent document calculates motion parameters without using any three-dimensional information, so that it is difficult to estimate the traveled distance with high accuracy.

SUMMARY OF THE INVENTION

It is an object of the invention to provide an analyzer which can analyze motion of a moving body with high accuracy.

According to an aspect of the invention, an analyzer configured to be installed on a moving body for analyzing motion of the moving body comprises an image pickup device for capturing images in a surrounding area of the moving body, an information calculation unit for setting a plurality of target points in each input image captured by the image pickup device and calculating three-dimensional information on the individual target points and two-dimensional optical flows thereof, and a movement calculation unit for calculating information on at least one of a forward moving speed and a turning speed of the moving body based on the three-dimensional information and the optical flows calculated by the information calculation unit.

The analyzer of the present invention is configured to set a plurality of target points in each input image obtained by shooting an image in a surrounding area of the moving body by the image pickup device and calculate the information on at least one of the forward moving speed and the turning speed of the moving body based on the three-dimensional information on the individual target points and the optical flows thereof. Since the analyzer separately calculates the forward moving speed and/or the turning speed of the moving body, the analyzer can analyze the motion of the moving body with high accuracy.

These and other objects, features and advantages of the invention will become more apparent upon reading the following detailed description along with the accompanying drawings.

BRIEF DESCRIPTION OF THE DRAWINGS

FIG. 1 is an overall configuration diagram of an analyzer according to a first embodiment of the invention;

FIG. 5 is a diagram showing examples of a standard image and a reference image;

FIG. 13 is a diagram showing an input image obtained when a moving body is running forward;

FIG. 14 is a flowchart showing details of corresponding point searching operation;

FIG. 18 is a diagram showing a mathematical treatment performed by a phase comparator;

DETAILED DESCRIPTION OF THE PREFERRED EMBODIMENTS OF THE INVENTION

First Embodiment

Figure 2A:
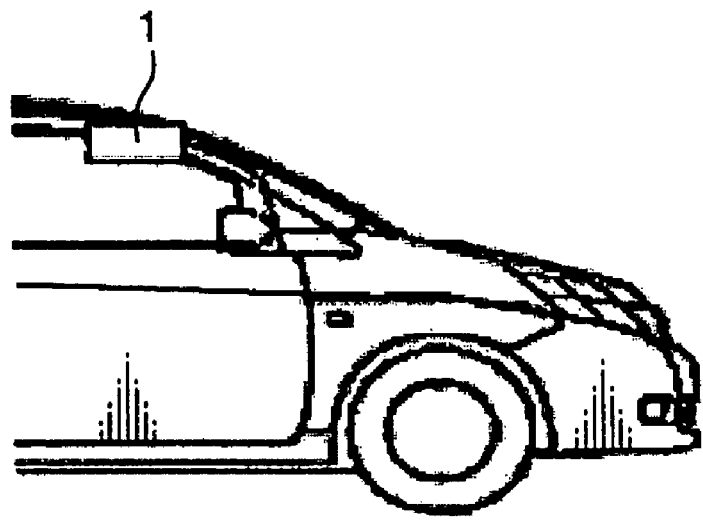
FIGS. 2A and 2B are diagrams showing an example of a mounting site of a stereo camera of the analyzer.
Figure 2B:
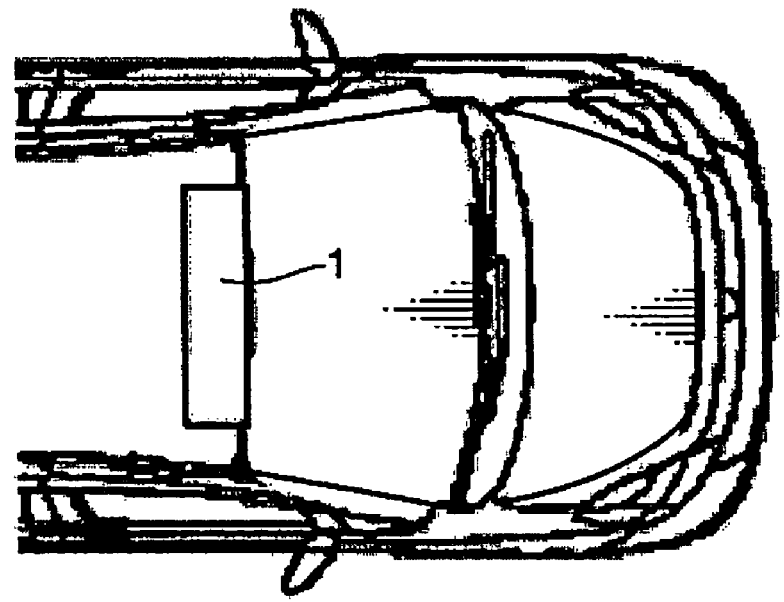

An analyzer according to a first embodiment of the present invention is now described. FIG. 1 is an overall configuration diagram of the analyzer of the first embodiment of the invention. Installed on a moving body like a motor vehicle, the analyzer is used for analyzing motion of the moving body based on images picked up by a plurality of image pickup devices. As shown in FIG. 1, the analyzer comprises a stereo camera 1, a processing unit 2 and a display unit 3, the stereo camera 1 including a pair of right and left cameras 11, 12 which are examples of the image pickup devices. FIGS. 2A and 2B are diagrams showing an example of a mounting site of the stereo camera 1. In this example, the stereo camera 1 is installed on a roof of the moving body (vehicle) close to a windshield thereof. It is to be noted however that the mounting site of the stereo camera 1 is not limited to the illustrated example but the stereo camera 1 may be installed at any appropriate location as long as an optical axis of the stereo camera 1 can be aimed in a forward direction of the moving body.

The right and left cameras 11, 12 are installed with a specific distance therebetween along a left/right direction which is a horizontal direction oriented at right angles to the forward moving direction of the moving body. The two cameras 11, 12 are located at the same height symmetrically on the right and left sides of the forward moving direction of the moving body to capture images in front of the moving body at a specific frame rate. Image pickup timings of the two cameras 11, 12 are synchronized so that the cameras 11, 12 can simultaneously capture images of such subjects as other vehicles, motorcycles, bicycles and/or passengers moving in front of the moving body.

Figure 12:
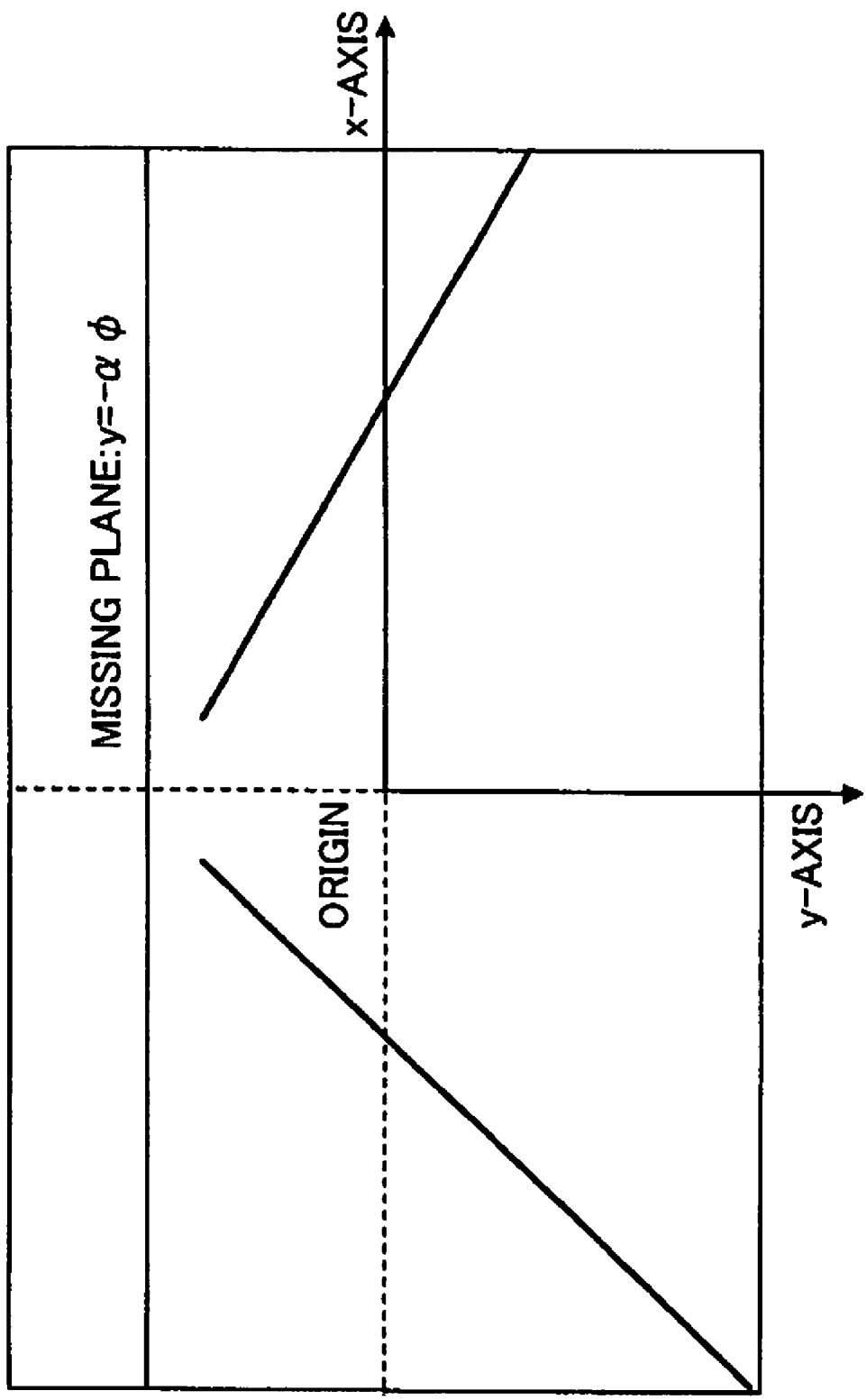
FIG. 12 is a diagram showing a coordinate system in which a standard image is presented.

In following discussion of the invention, each image captured by the camera 11 is referred to as a standard image and each image captured by the camera 12 is referred to as a reference image. Further, the standard and reference images are referred to collectively as input images. Each input image is composed of digital image data containing a plurality of pixels arranged in matrix form, wherein each pixel is assigned with one of 256 gradation values ranging from 0 (black) to 255 (white), for example. In this embodiment, the input image is represented by pixels mapped on a coordinate system of which origin is located at a central point and x- and y-axes define horizontal and vertical components, respectively, as depicted in FIG. 12, wherein x-coordinates to the right of the origin are positive and y-coordinates below the origin are positive.

The processing unit 2 is a hardware device including a central processing unit (CPU), a read-only memory (ROM) and a random access memory (RAM), for example. The processing unit 2 analyzes the motion of the moving body by processing each successive pair of images captured at the same time by the two cameras 11, 12. The display unit 3 includes a display device, such as a liquid crystal display (LCD) or an organic electroluminescent (EL) display, for displaying such information as results of analysis by the processing unit 2, for instance. If the moving body is provided with a vehicle navigation system, a display device of the navigation system may be used as the display unit 3 of the analyzer. Needless to say, even if a vehicle navigation system having a display device is available on-board, the analyzer may be provided with a dedicated display device to constitute the display unit 3.

Figure 3:
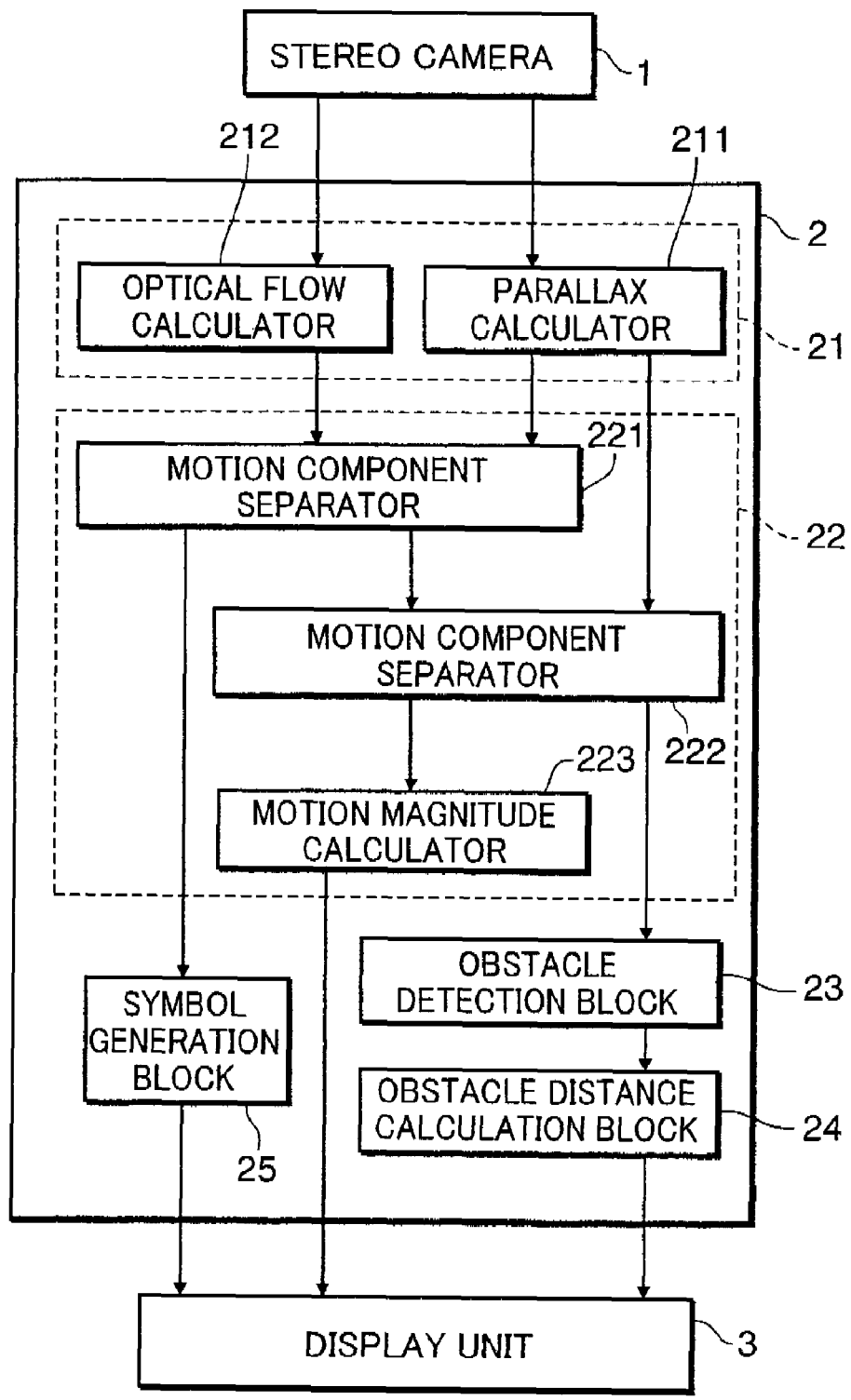
FIG. 3 is a functional block diagram of a processing unit of the analyzer.

FIG. 3 is a functional block diagram of the processing unit 2. As shown in FIG. 3, the processing unit 2 includes an information calculation block 21, a movement calculation block 22, an obstacle detection block 23, an obstacle distance calculation block 24 and an image generation block 25. The information calculation block 21 including a parallax calculator 211 and an optical flow calculator 212 sets a plurality of key target points in each input image captured by the stereo camera 1 and calculates three-dimensional information on the individual target points and two-dimensional optical flows thereof.

The parallax calculator 211 sets a plurality of target points in each standard image and calculates parallaxes (an example of the three-dimensional information) of the individual target points. Specifically, the parallax calculator 211 calculates the parallaxes of the individual target points by searching for points corresponding to the individual target points from the reference image of each successive frame. More specifically, the parallax calculator 211 sequentially sets multiple target points for a single standard image, searches for points in a reference image corresponding to the individual target points by using a search method, such as the phase-only correlation (POC) method or the sum of absolute differences (SAD) method, and calculates the parallaxes of the target points in the standard image and the corresponding points in the reference image.

The optical flow calculator 212 calculates two-dimensional optical flows of the individual target points by searching for points corresponding to the target points set in the standard image of a current frame from a standard image captured in a preceding frame or in a succeeding frame by using the POC or SAD method. The optical flows may be expressed by differences in horizontal and vertical components between the target points and the corresponding points.

The movement calculation block 22 includes a motion component separator 221 (which is an example of a first calculator mentioned in the appended claims), a road surface parameter estimator 222 (which is an example of a second calculator mentioned in the appended claims) and a motion magnitude calculator 223 (which is an example of a third calculator mentioned in the appended claims). The movement calculation block 22 calculates information on a forward moving speed and a turning speed of the moving body based on the three-dimensional information calculated by the parallax calculator 211 and the optical flows calculated by the optical flow calculator 212. The turning speed information contains angular velocities of the moving body (or of the stereo camera 1) in both a pitch direction and a pan direction.

The motion component separator 221 determines a straight line representing a group of target points located on a road surface (which is an example of a characteristic surface mentioned in the appended claims) contained in input images by plotting the individual target points in a two-dimensional coordinate space defined by a coordinate axis representing squares of the parallaxes and a coordinate axis representing vertical components of the optical flows. The motion component separator 221 then calculates the forward moving speed of the moving body based on the gradient of the straight line and the angular velocity of the moving body in the pitch direction based on the intercept of the straight line.

The road surface parameter estimator 222 determines the straight line representing the group of target points located on the road surface contained in the input images by plotting the individual target points in a two-dimensional coordinate space defined by a coordinate axis representing parallaxes and a coordinate axis representing vertical components of the target points. The road surface parameter estimator 222 then calculates the height of the stereo camera 1 from the road surface based on the gradient of the straight line and the angle of inclination of the stereo camera 1 in the pitch direction relative to the road surface based on the intercept of the straight line. The height of the stereo camera 1 from the road surface and the inclination angle of the stereo camera 1 relative to the road surface in the pitch direction are hereinafter referred to as road surface parameters.

The motion magnitude calculator 223 determines the straight line representing the group of target points located on the road surface contained in the input images by plotting the individual target points in a two-dimensional coordinate space defined by first coordinate values obtained from horizontal components of the optical flows, the forward moving speed, the parallaxes and horizontal components of the target points and second coordinate values obtained from the forward moving speed and parallaxes. The motion magnitude calculator 223 then calculates the angular velocity of the moving body in the pan direction based on the gradient of the straight line.

The obstacle detection block 23 judges whether any obstacle exists ahead of the moving body. Specifically, the obstacle detection block 23 detects an obstacle by extracting a target point which is other than the target points determined by the road surface parameter estimator 222 to be located on the road surface and judged by the optical flow calculator 212 to have an optical flow moving toward the moving body as being representative of the obstacle, for example.

If the obstacle detection block 23 judges that an obstacle is present, the obstacle distance calculation block 24 calculates the distance from the moving body to the obstacle. Then, if the distance is smaller than a predefined value, the obstacle distance calculation block 24 generates information for annunciating a dangerous situation and displays this information on the display unit 3.

The symbol generation block 25 produces a directional symbol having a length corresponding to the forward moving speed calculated by the motion component separator 221 and a direction indicated by the turning speed information and sends the directional symbol to the display unit 3 for on-screen presentation to notify a vehicle occupant of motion information concerning the motion of the moving body.

<<Working of the Analyzer>>

Figure 4:
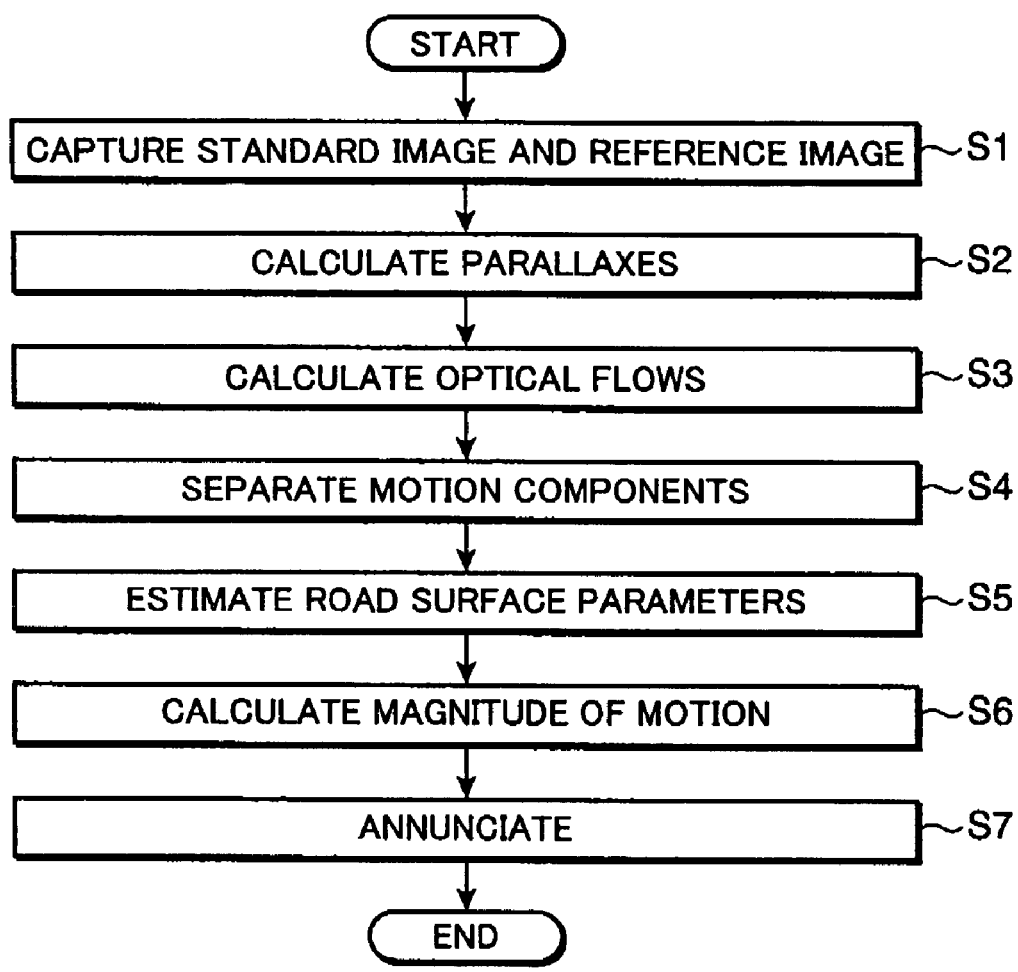
FIG. 4 is a flowchart showing how the analyzer of the first embodiment works.

The working of the analyzer of the first embodiment is now described. FIG. 4 is a flowchart showing how the analyzer of the embodiment works. First, in step S1, the stereo camera 1 captures a standard image and a reference image of a view ahead of the moving body and outputs the captured images to the processing unit 2. In the following discussion of the present embodiment, it is assumed that the stereo camera 1 is properly calibrated beforehand to cancel out aberration. Even if this condition is not satisfied, however, images picked up by the stereo camera 1 can be corrected for the aberration by using a known image processing technique. It is also assumed that the stereo camera 1 captures standard and reference images at time intervals, or frame refresh intervals, of $\Delta t$.

FIG. 5 is a diagram showing examples of the standard and reference images captured in step S1. In the examples of FIG. 5, the captured standard and reference images show a motor vehicle running ahead of the moving body.

In step S2, the parallax calculator 211 searches for points in the reference image corresponding to the individual target points set in the standard image captured at the same timing and calculates differences in horizontal and vertical components of each pair of target point and corresponding point to thereby determine parallaxes of the individual target points. Processing operation for searching for the corresponding points will be later described in detail.

Figure 6:
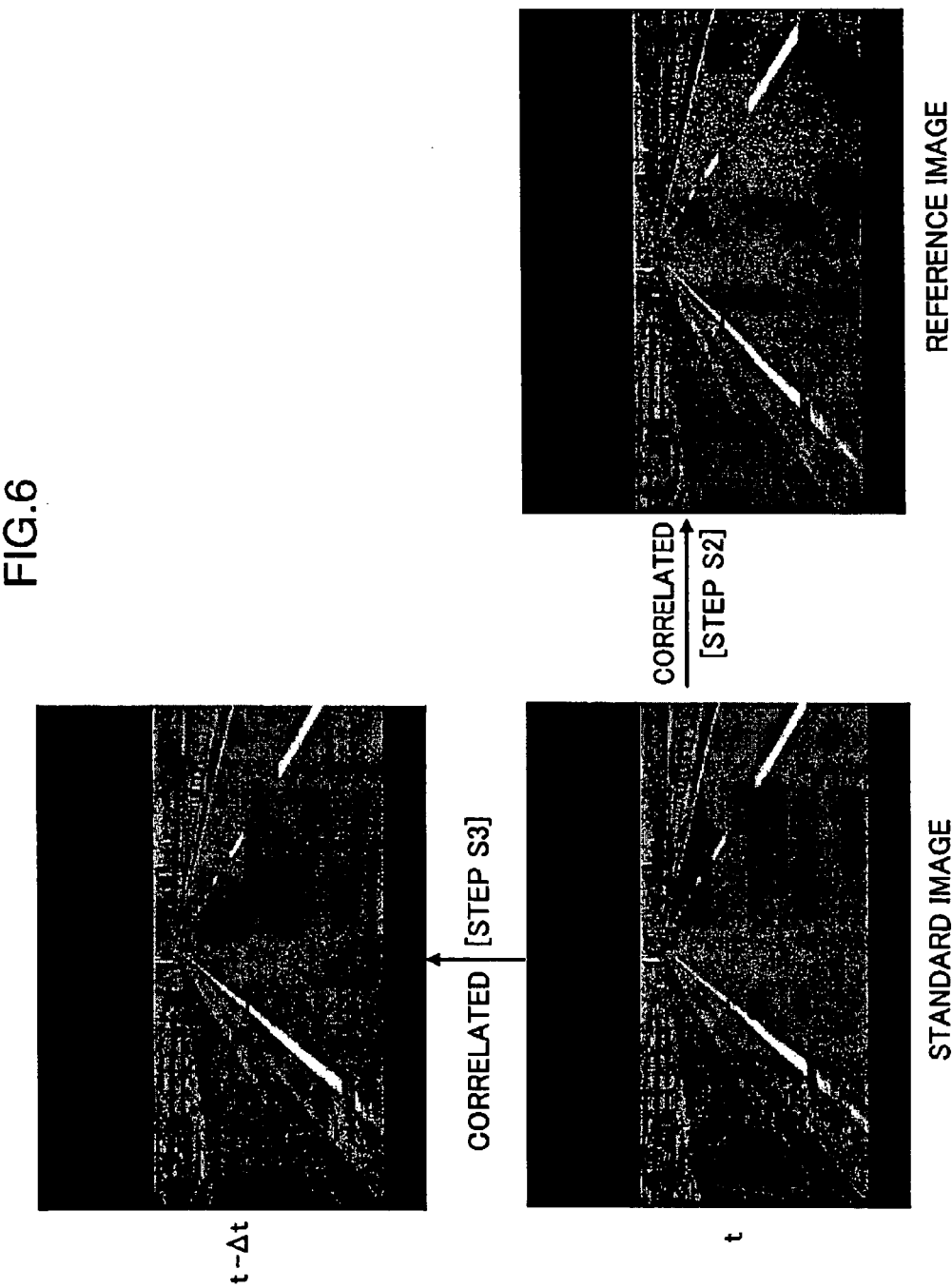
FIG. 6 is an explanatory diagram showing how parallaxes and optical flows are calculated.

FIG. 6 is an explanatory diagram showing how the parallaxes and optical flows are calculated. An image shown at top of FIG. 6 is a standard image captured at time $t-\Delta t$ and left and right images shown at bottom of FIG. 6 are a standard image and a reference image captured at time t, respectively. It can be seen from FIG. 6 that the motor vehicle running ahead of the moving body is shown in the standard and reference images taken at each point in time. In the discussion to follow hereunder, a frame taken at time $t-\Delta t$ is regarded as a preceding frame and a frame taken at time t is regarded as a current frame.

Referring to FIG. 6, the parallax calculator 211 finds out a point $(x2(t), y2(t))$ in the reference image corresponding to a target point $(x1(t), y1(t))$ set in the standard image and works out $(x1(t)-x2(t), y1(t)-y2(t))$ as a parallax, for example.

In step S3, the optical flow calculator 212 calculates two-dimensional optical flows of the individual target points. Referring to FIG. 6, the optical flow calculator 212 finds out a point $(x1(t-\Delta t), y1(t-\Delta t))$ corresponding to the target point $(x1(t), y1(t))$ set in the standard image from a standard image captured one frame earlier (or in the preceding frame) and works out $(x1(t)-x1(t-\Delta t), y1(t)-y1(t-\Delta t))$ as an optical flow of the target point, for example.

Figure 7:
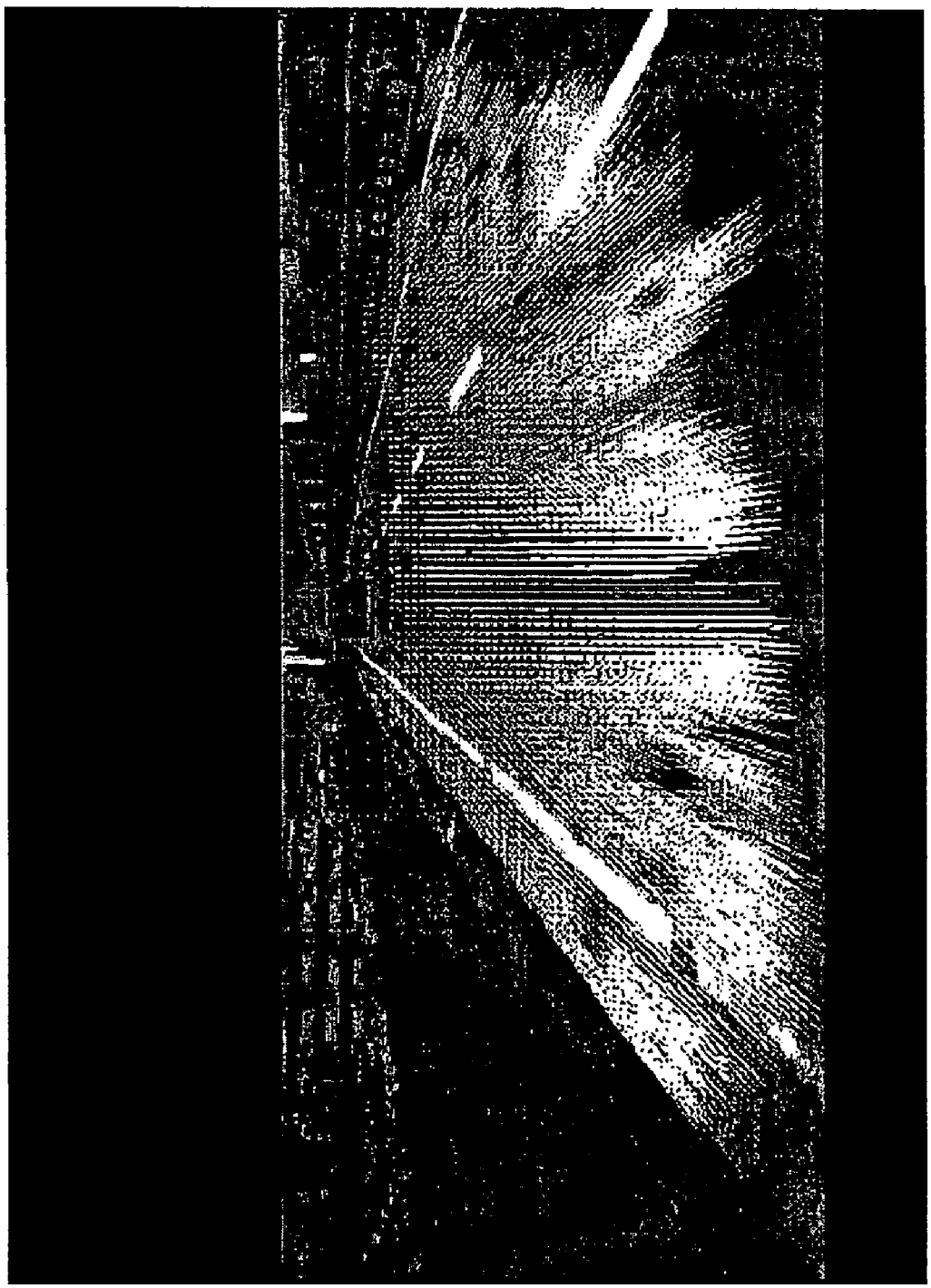
FIG. 7 is a diagram showing optical flows plotted in a standard image.

FIG. 7 is a diagram showing optical flows calculated by the optical flow calculator 212 and plotted in a standard image. White streaky traces marked on the road surface in FIG. 7 represent the optical flows. In FIG. 7, each of the optical flows is represented by a line segment having a length corresponding to the magnitude of the optical flow and a direction corresponding to the direction of the optical flow. The white streaky traces shown in the Figure become more congested downward along the road surface. This is because the magnitude of the optical flow increases downward along the road surface as illustrated. It is to be noted that optical flows of target points which are set on other than the road surface are omitted in FIG. 7.

Returning to FIG. 4, the motion component separator 221 calculates the forward moving speed of the moving body and the angular velocity thereof in the pitch direction in step S4. Specifically, the motion component separator 221 performs this calculation process as follows. First, the motion component separator 221 determines squares of the parallaxes of the individual target points and vertical components of the optical flows. Then, the motion component separator 221 plots the individual target points in a two-dimensional coordinate space defined by coordinate axes representing the squares of the parallaxes and the vertical components of the optical flows.

Figure 8A:
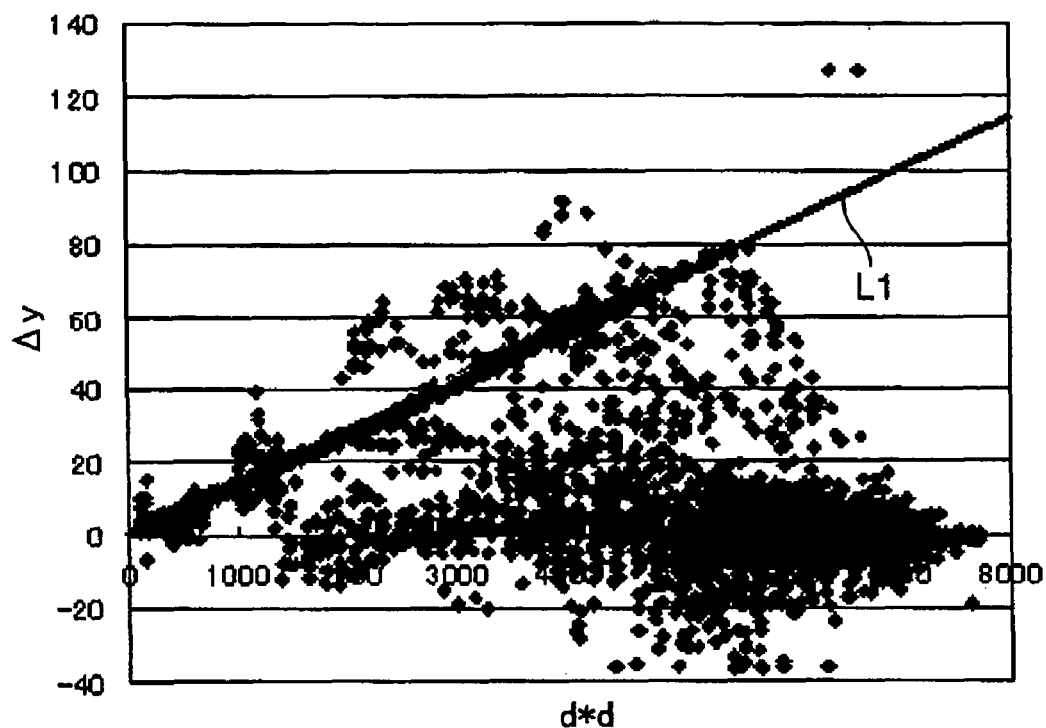
FIGS. 8A and 8B are explanatory diagrams of a process performed in step S4.
Figure 8B:
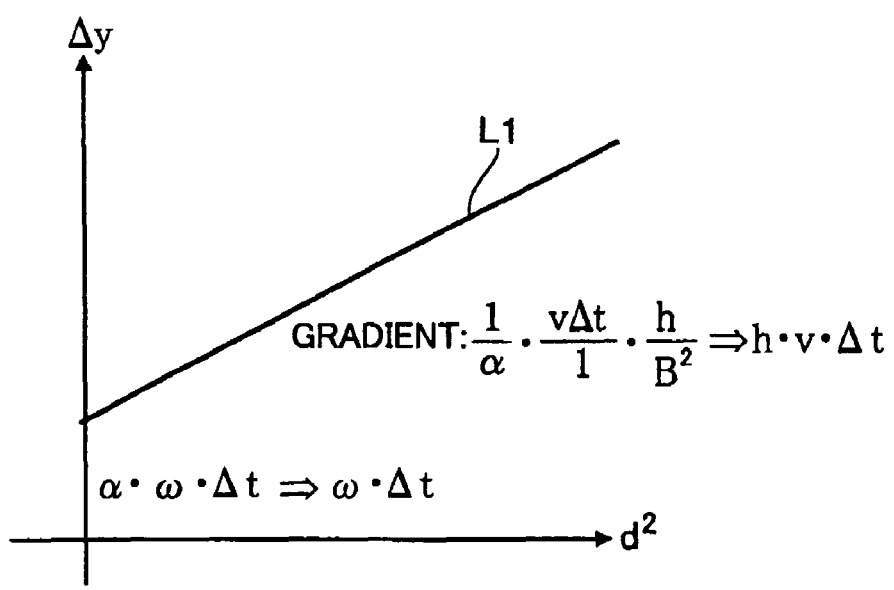

FIGS. 8A and 8B are explanatory diagrams of the process performed in step S4. FIGS. 8A and 8B are graphs showing plots in the two-dimensional coordinate space defined by the coordinate axes representing the squares of the parallaxes and the vertical components of the optical flows. In the graphs of FIGS. 8A and 8B, the vertical axis represents the vertical component ($\Delta y$) of each optical flow and the horizontal axis represents the square of each parallax ($d*d$). As shown in FIG. 8A, the individual target points are plotted in the two-dimensional coordinate space.

Subsequently, the motion component separator 221 determines a straight line L1 drawn by connecting the plotted target points by using a straight line extraction technique like the least squares method or Hough transform method. Then, the motion component separator 221 determines the gradient and intercept of the straight line L1 and calculates the forward moving speed of the moving body and the angular velocity thereof in the pitch direction from the gradient and intercept of the straight line L1, respectively. In this connection, the inventor of the present invention has discovered that the square of the parallax ($d^2$) and the vertical component ($\Delta y$) of the optical flow have a relationship expressed by equation (A) below:

$$\Delta y = \frac{1}{\alpha} \cdot \frac{v \Delta t}{1} \cdot \frac{h}{B^2} d^2 - \alpha \cdot \omega \Delta t \quad (A)$$

where $\alpha$ is a camera parameter, v is the forward moving speed, $\Delta t$ is the frame refresh interval, h is the height of the stereo camera 1, $\omega$ is the angular velocity thereof in the pitch direction and B is the distance between the two cameras 11, 12 of the stereo camera 1. As shown in FIG. 8B, equation (A) above represents the straight line L1, in which $\Delta y$ and $d^2$ are variables, $(1/\alpha) \cdot (v \cdot \Delta t/1) \cdot (h/B^2)$ is the gradient of the straight line L1, $-\alpha \cdot \omega \cdot \Delta t$ is the intercept of the straight line L1, and $\alpha$, B and $\Delta t$ are constants.

It is understood from above that h·v and the angular velocity $\omega$ of the moving body in the pitch direction can be calculated by determining the gradient and intercept of the straight line L1 and using the constants $\alpha$, B and $\Delta t$. While a value of h is obtained in step S5 described below, it is possible to calculate the forward moving speed v in a stage of step S4 if a predetermined initial value of h is given or a value of h obtained in step S5 in the preceding frame is used, for example.

Figure 11:
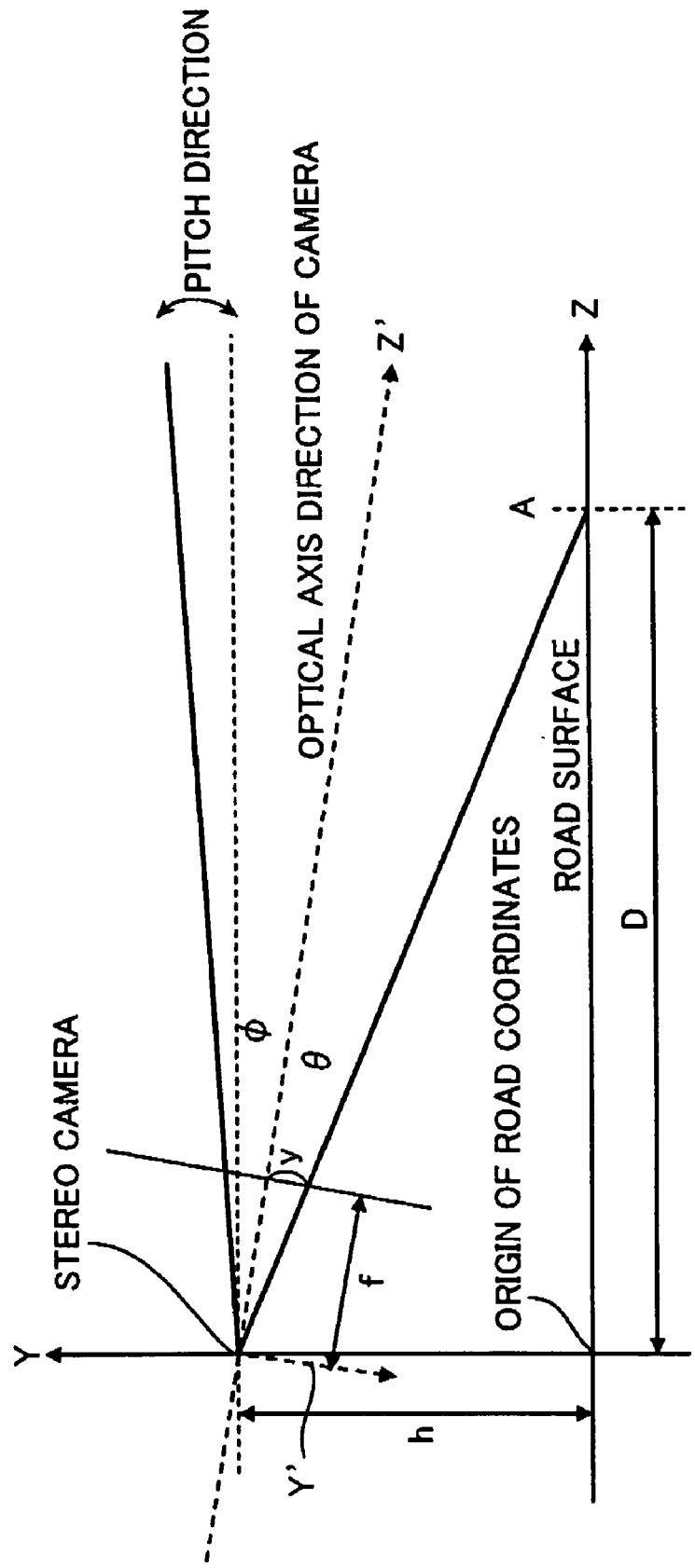
FIG. 11 is an explanatory diagram showing a relationship between a mounting site of the stereo camera and image pickup conditions.

FIG. 11 is an explanatory diagram showing a positional relationship between the stereo camera 1 and the road surface, in which Y indicates a vertical direction, Z indicates the forward moving direction of the moving body, Z' indicates an optical axis direction of the stereo camera 1, $\phi$ indicates the angle of inclination of the stereo camera 1 in the pitch direction relative to the Z direction, f indicates a focal length, Y' indicates a vertical component in the input image, h indicates the height of the stereo camera 1 from the road surface, and y indicates a vertical component in the input image of a point A on the road surface at a distance D from the moving body in the Z direction.

The angular velocity $\omega$ of the moving body in the pitch direction and the forward moving speed v of the moving body in the Z direction shown in FIG. 11 are obtained by the process performed in step S4. While the aforementioned value of v is adopted as the forward moving speed of the moving body in step S4, the value of v·$\Delta t$ which is the forward moving speed per frame refresh interval may be adopted as the forward moving speed of the moving body.

Returning to FIG. 4, the road surface parameter estimator 222 calculates the road surface parameters in step S5. Specifically, the road surface parameter estimator 222 performs this calculation process as follows. First, the road surface parameter estimator 222 determines parallaxes of the individual target points and vertical components of the target points. Then, the road surface parameter estimator 222 plots the individual target points in a two-dimensional coordinate space defined by coordinate axes representing the parallaxes and the vertical components of the target points.

Figure 9A:
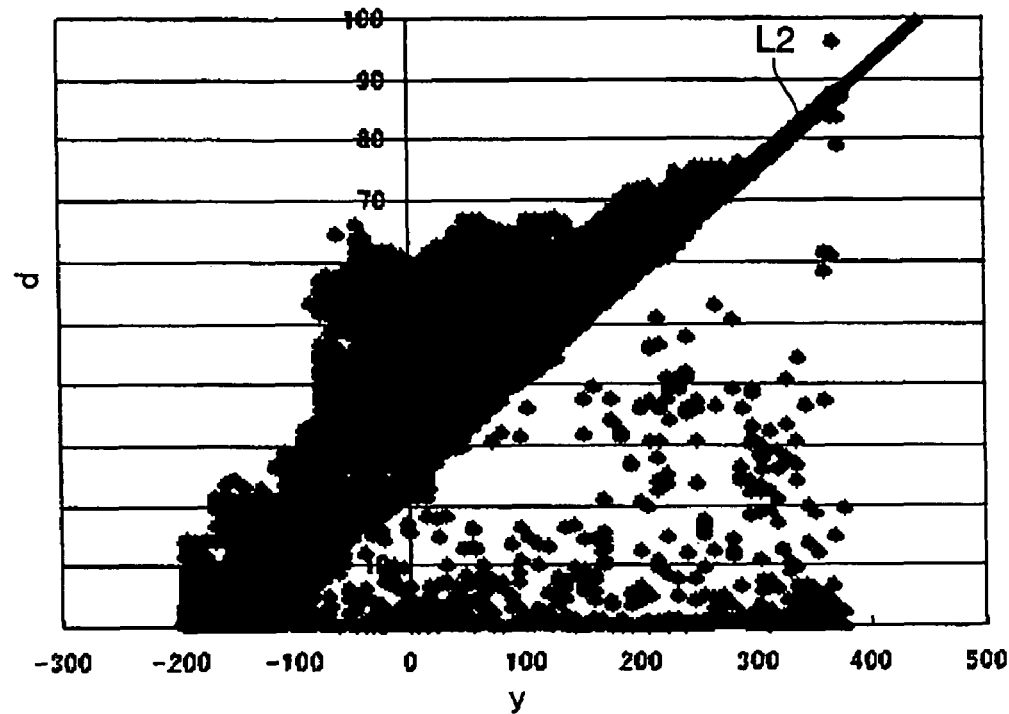
FIGS. 9A and 9B are explanatory diagrams of a process performed in step S5.
Figure 9B:
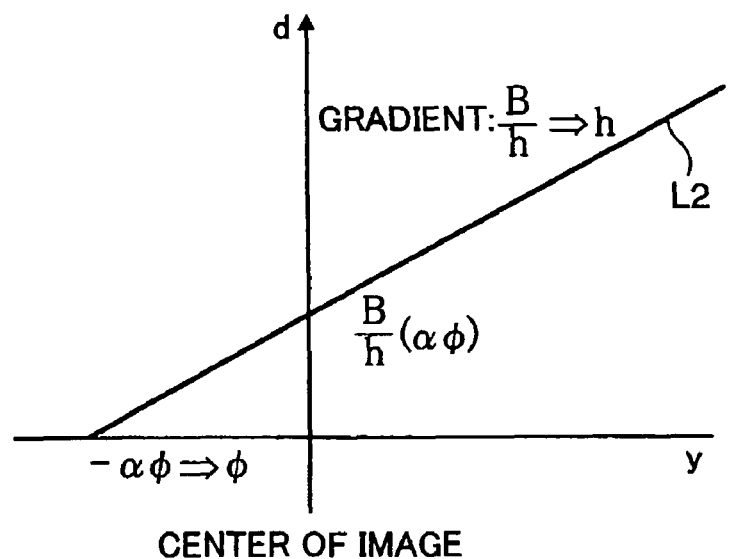

FIGS. 9A and 9B are explanatory diagrams of the process performed in step S5. FIGS. 9A and 9B are graphs showing plots in the two-dimensional coordinate space defined by the coordinate axes representing the parallaxes and the vertical components of the target points. In the graphs of FIGS. 9A and 9B, the horizontal axis represents the vertical component (y) of each target point and the vertical axis represents the parallax (d). As shown in FIG. 9A, the individual target points are plotted in the two-dimensional coordinate space.

Subsequently, the road surface parameter estimator 222 determines a straight line L2 drawn by connecting the plotted target points by using a straight line extraction technique like the least squares method or Hough transform method. Then, the road surface parameter estimator 222 determines the gradient and intercept of the straight line L2 and calculates the height h of the stereo camera 1 and the angle of inclination $\phi$ of the stereo camera 1 in the pitch direction from the gradient and intercept of the straight line L2, respectively. In this connection, the inventor of the present invention has discovered that the parallax (d) and the vertical component (y) of each target point have a relationship expressed by equation (B) below:

$$d = \frac{B}{h}(y + \alpha \phi) \quad (B)$$

As shown in FIG. 9B, equation (B) above represents the straight line L2, in which y and d are variables, B/h is the gradient of the straight line L2, $(B/h) \cdot (\alpha \cdot \phi)$ is the intercept of the straight line L2, and B and $\alpha$ are constants.

It is understood from above that the height h of the stereo camera 1 can be calculated by determining the gradient of the straight line L2 and using the constant B and the angle of inclination $\phi$ of the stereo camera 1 in the pitch direction can be calculated by determining the intercept of the straight line L2 and using the constants B, $\alpha$ and the calculated height h. In other words, the road surface parameters can be calculated in this fashion.

If the stereo camera 1 is of a rolling shutter type, the height h and the angle of inclination $\phi$ of the stereo camera 1 can be calculated with high accuracy by using equation (B') below:

$$d = \frac{B}{h}(y(1 + \alpha \cdot \omega \cdot \delta 1) + \alpha \phi_0) \quad (B')$$

where $\phi_0$ indicates the angle of inclination of the stereo camera 1 in the pitch direction at a point in time when a pixel of the stereo camera 1 corresponding to a central point of the input image is exposed and $\delta 1$ indicates a difference in exposure timing from one horizontal scanning line to the next. Equation (B') is an equation obtained by substituting $\phi_0 + \omega \cdot y \cdot \delta 1$ for $\phi$ into equation (B). Equation (B') above represents the straight line L2, in which y and d are variables, $(B/h) \cdot (1 + \alpha \cdot \omega \cdot \delta 1)$ is the gradient of the straight line L2, and $(B/h) \cdot (\alpha \cdot \phi_0)$ is the intercept of the straight line L2.

As depicted in FIG. 11, the value of $\phi$ obtained from equation (B) gives the angle of inclination of the stereo camera 1 in the pitch direction at the point in time when the pixel of the stereo camera 1 corresponding to the central point of the input image is exposed and this inclination angle corresponds to $\phi_0$ in $\phi = \phi_0 + \omega \cdot y \cdot \delta 1$. Also, since $\omega$ is obtained in step S4 and $\delta 1$ is a constant, it is possible to obtain equation (B') and make a correction for $\phi$ by substituting $\phi$ obtained from equation (B) for $\phi_0$ into $\phi = \phi_0 + \omega \cdot y \cdot \delta 1$.

Returning to FIG. 4, the motion magnitude calculator 223 calculates the angular velocity of the moving body in the pan direction in step S6. Specifically, the motion magnitude calculator 223 performs this calculation process as follows. First, the motion magnitude calculator 223 determines the first and second coordinate values of each target point. The first coordinate value is calculated by $\Delta x - (1/\alpha) \cdot (v \cdot \Delta t/1) \cdot (1/B) \cdot d \cdot x$, where $\Delta x$ indicates a horizontal component of an optical flow and x indicates a horizontal component of a target point. Since $\alpha$, B and $\Delta t$ are constants and $\Delta x$, d and x are obtained in steps S2 and S3, it is possible to calculate the first coordinate value.

Also, the second coordinate value is calculated by $-(\alpha + (v \cdot \Delta t/2) \cdot (1/B) \cdot d) \sigma \cdot \Delta t$, where $\sigma$ indicates the angular velocity of the moving body in the pan direction. Since $\alpha$, B and $\Delta t$ are constants and v is obtained in step S4, it is possible to calculate the second coordinate value. Then, the motion magnitude calculator 223 plots the individual target points in a two-dimensional coordinate space defined by coordinate axes representing the first and second coordinate values.

Figure 10A:
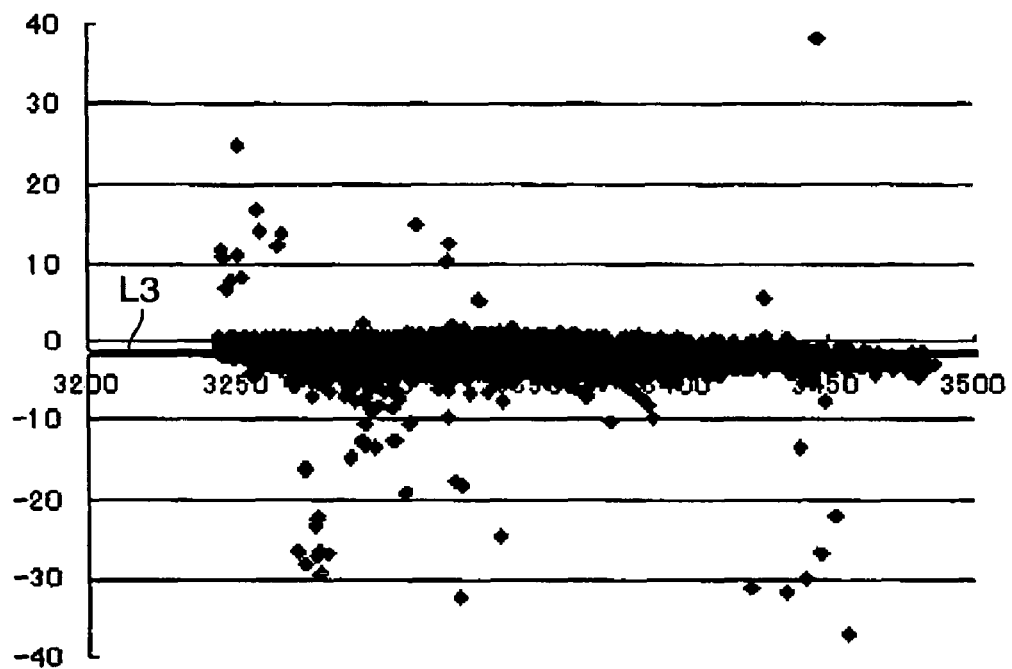
FIGS. 10A and 10B are explanatory diagrams of a process performed in step S6.
Figure 10B:
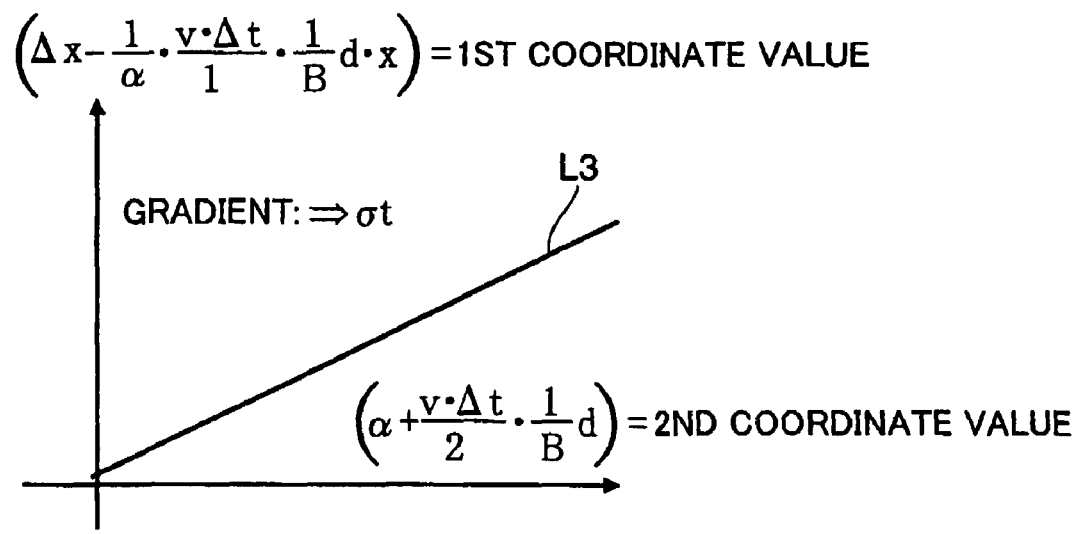

FIGS. 10A and 10B are explanatory diagrams of the process performed in step S6. FIGS. 10A and 10B are graphs showing plots in the two-dimensional coordinate space defined by the coordinate axes representing the first and second coordinate values. In the graphs of FIGS. 10A and 10B, the vertical axis represents the first coordinate value and the horizontal axis represents the second coordinate value. As shown in FIG. 10A, the individual target points are plotted in the two-dimensional coordinate space.

Subsequently, the motion magnitude calculator 223 determines a straight line L3 drawn by connecting the plotted target points by using a straight line extraction technique like the least squares method or Hough transform method. Then, the motion magnitude calculator 223 determines the gradient of the straight line L3 and calculates the angular velocity $\sigma$ of the moving body in the pan direction from the gradient of the straight line L3. In this connection, the inventor of the present invention has discovered that the angular velocity $\sigma$ of the moving body in the pan direction has a relationship expressed by equation (C) below:

$$\left(\Delta x - \frac{1}{\alpha} \cdot \frac{v\Delta t}{1} \cdot \frac{1}{B} d \cdot x\right) = -\left(\alpha + \frac{v\Delta t}{2} \cdot \frac{1}{B} d\right) \sigma \Delta t \quad (C)$$

As shown in FIG. 10B, equation (C) above represents the straight line L3, in which the first and second coordinate values are variables and $\sigma \cdot \Delta t$ is the gradient of the straight line L3. It is understood from above that the angular velocity $\sigma$ of the moving body in the pan direction can be calculated by determining the gradient of the straight line L3 and using $\Delta t$. While the aforementioned value of $\sigma$ is adopted as the angular velocity of the moving body in the pan direction in step S6 above, the value of $\sigma \cdot \Delta t$ which is the angular velocity of the moving body in the pan direction per frame refresh interval may be adopted as the angular velocity in the pan direction.

Returning again to FIG. 4, the symbol generation block 25 produces a directional symbol and sends the directional symbol to the display unit 3 for on-screen presentation. For example, the display unit 3 displays a directional symbol G1 shown in FIG. 1. As shown in FIG. 1, the directional symbol G1 is a graphic symbol having a length determined according to the forward moving speed v and a direction determined according to the angular velocity $\sigma$ in the pan direction, so that the vehicle occupant can easily recognize the motion information representative of the motion of the moving body.

<<How to Derive Equations (A)-(C)>>

Described below with reference to FIGS. 11 to 13 is how equations (A) to (C) are derived.

(i) Positional Relationship Between Camera and Road Surface

The mounting site of the stereo camera 1 and image pickup conditions have a relationship as shown in FIG. 11. The stereo camera 1 is installed at an inclination in the pitch direction relative to the forward moving direction Z and at approximately zero inclinations in the pan direction and roll direction of the moving body. FIG. 12 shows the coordinate system in which a standard image is presented. A central point of the standard image is placed at the origin of the coordinate system and horizontal and vertical components of the standard image are defined by the x- and y-axes of the coordinate system, respectively, as shown in FIG. 12.

From FIG. 11, a relationship between a coordinate y of a point A in the standard image and the distance D to the point A can be expressed by equation (1) below:

$$h/D = \tan(\tan^{-1}(y/\alpha) + \phi) \quad (1)$$

where $\alpha = f/p = N/2\theta$, p indicating a pixel pitch, N indicating the number of pixels, and $\theta$ indicating a view angle. The stereo camera 1 of this embodiment may be configured to have $N = 1280 \times 960$ pixels, pixel pitch p of 0.00465 mm, a focal length f of 15 mm, and a camera-to-camera distance B of 210 mm.

If h/D and y/$\alpha$ are sufficiently smaller than 1, equation (1) can be simplified as follows:

$$h/D = (1/\alpha) \cdot y + \phi \quad (2)$$

From equation (2) above, the distance D to the point A on the road surface at the coordinate y is expressed by equation (3) below:

$$D = \alpha \cdot h/(y + \alpha \cdot \phi) \quad (3)$$

On the other hand, a relationship between a parallax of the stereo camera (parallel stereo) and the distance to a point on the road surface is expressed by equation (4) below:

$$D = B \cdot \alpha \cdot (1/d) \quad (4)$$

From equations (3) and (4) above, a relationship between the parallax and the point in the image of the road surface is obtained as equation (5) below:

$$d = (B/h) \cdot (y + \alpha \cdot \phi) \quad (5)$$

If the stereo camera 1 is of a low-cost rolling shutter type employing complementary metal-oxide-semiconductor (CMOS) sensors, the stereo camera 1 is influenced by rotary motion in the pitch direction and, in this case, equation (5) above is rewritten as follows:

$$d = (B/h) \cdot (y(1 + \alpha \cdot \omega \cdot \delta 1) + \alpha \cdot \phi_0) \quad (5')$$

In the rolling shutter type stereo camera, there is a difference in exposure timing from one horizontal scanning line to the next, so that the value of $\phi$ varies with the lapse of time due to pitching motion of the stereo camera 1.

Therefore, the angle of inclination $\phi$ of the stereo camera 1 is expressed as follows:

$$\phi \rightarrow \phi_0 + \omega \cdot y \cdot \delta 1$$

where $\phi_0$ indicates the angle of inclination of the stereo camera 1 in the pitch direction at the point in time when the pixel of the stereo camera 1 corresponding to the central point of the input image is exposed and $\delta 1$ indicates the difference in exposure timing from one horizontal scanning line to the next. Thus, y·δ1 indicates an exposure time. Substituting this into equation (5) above:

$$d=(B/h) \cdot (y+\alpha(\phi_0 + y \cdot \omega \cdot \delta 1))$$

Equation (5') is obtained by modifying the above equation.

(ii) Optical Flows Due to Forward Movement of Moving Body

FIG. 13 is a diagram showing an input image obtained when the moving body is running forward. When the moving body is running forward, optical flows of target points defined on the road surface converge at a point $(0, -\alpha\phi)$. Here, a surface defined by straight lines parallel to a horizontal straight line passing through the point $(0, -\alpha\phi)$ is referred to as a missing plane. The y-coordinates of the point A on the road surface in the input image separated by the distance D from the moving body in the Z direction at time t0 and at time t1 after a lapse of Δt seconds from time t0 are calculated as follows:

$$y0 = \alpha \cdot (h/D - \phi)$$

$$y1 = \alpha \cdot (h/(D - v \cdot \Delta t) - \phi) \qquad (6)$$

Thus, a position change of the point A during the period Δt is calculated as follows:

$$\Delta y = y1 - y0 = \alpha \cdot (h/(D - v \cdot \Delta t) - h/D)$$

$$= \alpha \cdot (v \cdot \Delta t \cdot h/(D - v \cdot \Delta t) \cdot D)$$

$$\approx \alpha \cdot v \cdot \Delta t \cdot h/D^2 \qquad (7)$$

Also, as can be seen from FIG. 13, the horizontal component Δx of the optical flow of the point A is calculated by equation (8) below using Δy:

$$\Delta x = x \cdot \Delta y/(y + \alpha \cdot \phi) \qquad (8)$$

Expressing D by y using equation (3), the optical flow Δx, Δy of the point A produced by forward movement of the moving body can be expressed as follows, using equations (7) and (8) above:

$$\Delta y = (1/\alpha) \cdot (v \cdot \Delta t/h) \cdot (y + \alpha \cdot \phi)^2$$

$$\Delta x = (1/\alpha) \cdot (v \cdot \Delta t/h) \cdot (y + \alpha \cdot \phi) \cdot x \cdot d \qquad (9)$$

(iii) Optical Flows Due to Pitching (Rotary Motion in the Pitch Direction) of Moving Body The y-coordinates of the point A on the road surface in the input image separated by the distance D from the moving body at time t0 and at time t1 after a lapse of Δt seconds from time t0 are calculated as follows:

$$y0 = \alpha \cdot (h/D - \phi)$$

$$y1 = \alpha \cdot (h/D - (\phi + \omega \cdot \Delta t)) \qquad (10)$$

Thus, from equation (10) above, the optical flow Δx, Δy of the point A produced by pitching of the moving body can be expressed as follows:

$$\Delta y = y1 - y0 = -\alpha \cdot \omega \cdot \Delta t$$

$$\Delta x = 0 \qquad (11)$$

(iv) Optical Flows Due to Steering (Rotary Motion in the Pan Direction) of Moving Body Steering of the moving body produces translational motion and rotation of the moving body in a lateral direction. Therefore, provided that the angular velocity of the moving body in the pan direction is σ, the amount of translational motion b in the lateral direction of the moving body can be calculated as follows:

$$b = v \cdot \Delta t / \sin(\sigma \cdot \Delta t) - v \cdot \Delta t / \tan(\sigma \cdot \Delta t)$$

$$= v \cdot \Delta t \cdot (\tan(\sigma \cdot \Delta t) - \sin(\sigma \cdot \Delta t)) / (\sin(\sigma \cdot \Delta t) \cdot \tan(\sigma \cdot \Delta t))$$

$$\approx (v \cdot \Delta t / (\sigma \cdot \Delta t)^2) \cdot (1/2) \cdot (\sigma \cdot \Delta t)^3$$

$$= (1/2) \cdot v \cdot \Delta t \cdot \sigma \cdot \Delta t$$

As indicated by equation (5) above, an optical flow expressed by $\Delta x = (b/h) \cdot (y + \alpha \cdot \phi) = (v \cdot \Delta t/2h) \cdot (y + \alpha \cdot \phi) \cdot \sigma \cdot \Delta t$ occurs in the input image. Thus, the optical flow Δx, Δy of the point A produced by steering of the moving body can be expressed as follows:

$$\Delta x = -(\alpha + (v \cdot \Delta t/2h) \cdot (y + \alpha \cdot \phi)) \cdot \sigma \cdot \Delta t$$

$$\Delta y = 0 \qquad (12)$$

(v) Conclusion from (i) to (iv)

From the foregoing discussion in (i) to (iv), the optical flow Δx, Δy of the point A produced when the moving body is running forward, pitching and steered can be expressed by equations (9), (11) and (12) above.

$$\Delta y = (1/\alpha) \cdot (v \cdot \Delta t/h) \cdot (y + \alpha \cdot \phi)^2 - \alpha \cdot \omega \cdot \Delta t \qquad (13)$$

$$\Delta x = (1/\alpha) \cdot (v \cdot \Delta t/h) \cdot (y + \alpha \cdot \phi) \cdot d \cdot x$$

$$- (\alpha + (v \cdot \Delta t/2h) \cdot (y + \alpha \cdot \phi)) \cdot \sigma \cdot \Delta t \qquad (14)$$

By using equation (5) in equations (13) and (14) above, a relationship between optical flows and parallaxes expressed by the following equations (where α=f/p=N/2θ) is obtained:

$$d = (B/h) \cdot (y + \alpha \cdot \phi) \qquad (5)$$

$$\Delta y = (1/\alpha) \cdot (v \cdot \Delta t/1) \cdot (h/B^2) \cdot d^2 - \alpha \cdot \omega \cdot \Delta t \qquad (15)$$

$$\Delta x = (1/\alpha) \cdot (v \cdot \Delta t/1) \cdot (1/B) \cdot d \cdot x$$

$$- (\alpha + (v \cdot \Delta t1/2) \cdot (1/B) \cdot d)\sigma \cdot \Delta t \qquad (16)$$

Equations (5), (15) and (16) above correspond to earlier-mentioned equations (B), (A) and (C), respectively. Parameters calculated by equations (5), (15) and (16) are as follows:

h: Height of stereo camera 1 from road surface
φ: Inclination angle of stereo camera 1 in pitch direction
v: Forward moving speed of stereo camera 1
σ: Angular velocity of stereo camera 1 in pan direction
ω: Angular velocity of stereo camera 1 in pitch direction Also, given below are known parameters contained in equations (5), (15) and (16):

d: Parallax of each target point
Δx, Δy: Optical flow of each target point

It is understood from the foregoing discussion that the stereoscopic parallax and optical flow of each target point on the road surface have below-described binding relationships 1 to 3 defined by equations (5), (15) and (16):

Binding relationship 1: If the value of $\Delta y - d^2$ lies on a straight line, h·v and ω are determined from the gradient and the intercept of the straight line, respectively, by using equation (15)

Binding relationship 2: If the value of d−y lies on a straight line, h and φ are determined from the gradient and the intercept of the straight line, respectively, by using equation (15). Binding relationships 1 and 2 make it possible to perform robust processing operation of determining the straight line by the Hough transform method.

Binding relationship 3: it possible to determine the value of σ by applying equation (16) to each target point which satisfies the aforementioned 1 and 2.

<<How to Search for Corresponding Points>>

Now, the processing operation performed in the earlier-described steps S3, S4 for searching for points corresponding to target points is described in detail. The following discussion deals with an example of the corresponding point searching operation performed by the parallax calculator 211. The corresponding point searching operation performed by the optical flow calculator 212 is not described herein because this searching operation is essentially the same as the below-described searching operation performed by the parallax calculator 211 if the standard image is captured in a preceding frame and the reference image is captured in a current frame.

Figure 15A:
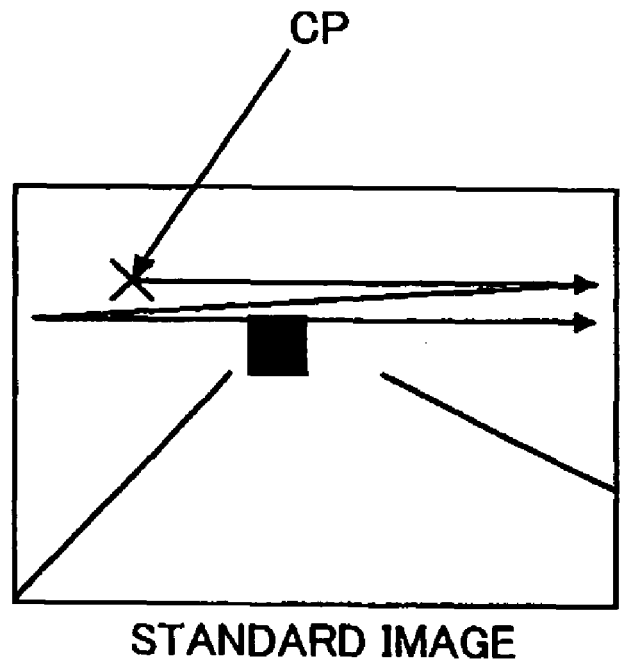
FIGS. 15A and 15B are diagrams illustrating target point setting operation.
Figure 15B:
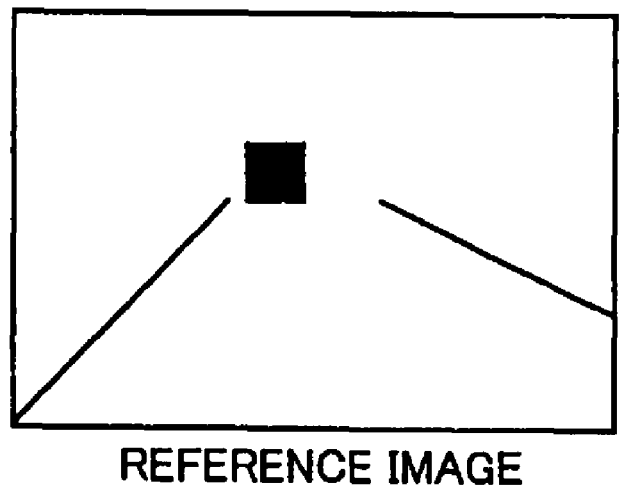

FIG. 14 is a flowchart showing details of the corresponding point searching operation. First, in step S21, the parallax calculator 211 judges whether scanning of the standard image for sequentially setting target points has been finished. If the standard image has been fully scanned (Yes in step S21), the parallax calculator 211 terminates the corresponding point searching operation. If the scanning has not been finished (No in step S21), on the other hand, the parallax calculator 211 sets the target points in the standard image (step S22). FIGS. 15A and 15B are diagrams illustrating target point setting operation.

The parallax calculator 211 sequentially sets target points CP by scanning the standard image from an upper-left corner to a lower-right corner in the manner of raster scan as shown in FIG. 15A. Upon calculating a point corresponding to the target point at the lower-right corner of the standard image, the parallax calculator 211 decides that the judgment result in step S21 is in the affirmative and terminates the corresponding point searching operation. The parallax calculator 211 may set the individual pixels of the standard image or only those pixels sampled therefrom at specific intervals as target points.

Figure 16:
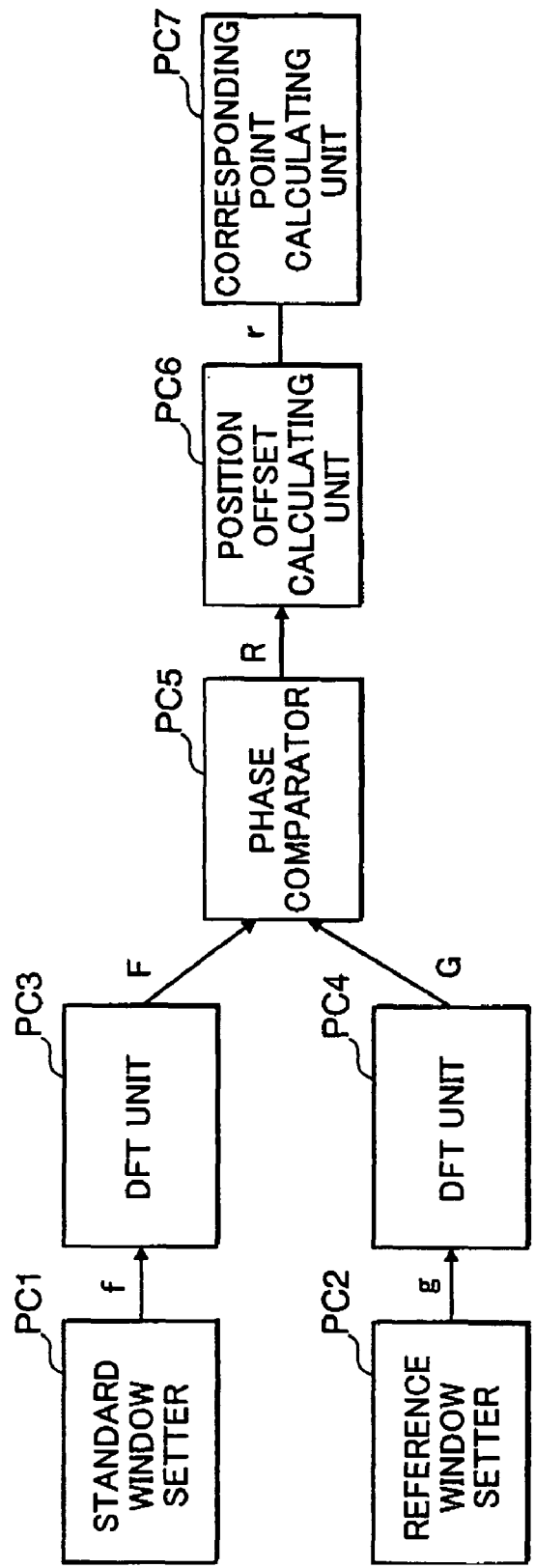
FIG. 16 is a functional block diagram of a phase-only correlation (POC) calculator for carrying out a POC method.

In step S23, the parallax calculator 211 searches for points in the reference image corresponding to the target points set in step S22 by using the POC method and returns to step S21. FIG. 16 is a functional block diagram of a POC calculator for carrying out the POC method. Such a POC calculator is contained in either of the parallax calculator 211 and the optical flow calculator 212. As shown in FIG. 16, the POC calculator includes a standard window setter PC1, a reference window setter PC2, a discrete Fourier transform (DFT) unit PC3, a DFT unit PC4, a phase comparator PC5, a position offset calculating unit PC6 and a corresponding point calculating unit PC7.

Figure 17A:
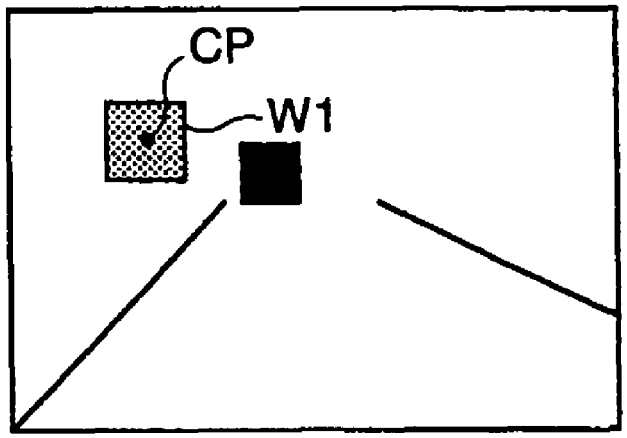
FIGS. 17A and 17B are explanatory diagrams showing a standard window and a reference window, respectively.
Figure 17B:
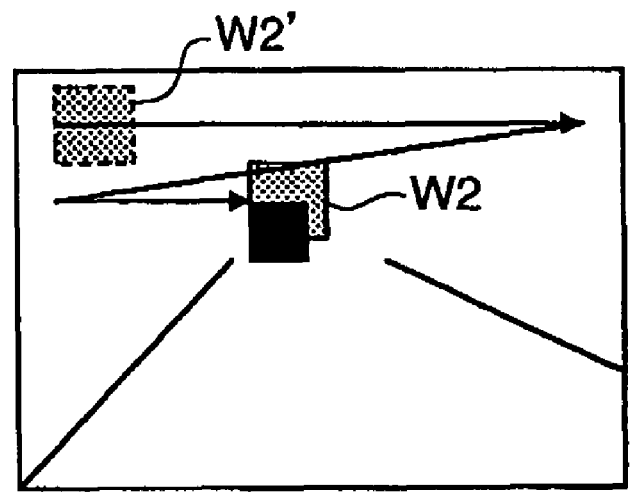

The standard window setter PC1 sets a standard window in the standard image and the reference window setter PC2 sets a reference window in the reference image. FIGS. 17A and 17B are explanatory diagrams showing standard and reference windows, respectively. Specifically, FIG. 17A shows a standard window W1 set in the standard image while FIG. 17B shows a reference window W2 set in reference image.

The standard window W1 and the reference window W2 have the same size which is as large as 31×31 pixels, for example. The standard window setter PC1 sets the standard window W1 in such a way that a central point of the standard window W1 coincides with the target point CP set in the standard image as shown in FIG. 17A. On the other hand, the reference window setter PC2 moves a window W2' having the same size as the standard window W1 along a raster-scan sweep pattern on the reference image as shown in FIG. 17B. In this raster-scan process, the reference window setter PC2 searches for a location on the reference image where a segmental image in the window W2' best matches a segmental image in the standard window W1 by using a pattern matching technique and sets the reference window W2 at that location. The reference window setter PC2 may carry out correlation processing or the SAD method, for example, for finding out the location of optimum pattern matching.

Returning to FIG. 16, the DFT unit PC3 performs a discrete Fourier transformation of an image element f(n1, n2) in the standard window W1 to produce an image element F(k1, k2), and the DFT unit PC4 performs a discrete Fourier transformation of an image element g(n1, n2) in the reference window W2 to produce an image element G(k1, k2).

The phase comparator PC5 multiplies the image element F(k1, k2) by a complex conjugate of the image element G(k1, k2) to produce a correlation image element R(k1, k2). FIG. 18 is a diagram showing a mathematical treatment performed by the phase comparator PC5. An upper-left graph in FIG. 18 shows amplitude and phase components of the image element F(k1, k2), a lower-left graph in FIG. 18 shows amplitude and phase components of the image element G(k1, k2), and a right graph in FIG. 18 shows amplitude and phase components of the correlation image element R(k1, k2). As shown in the right graph in FIG. 18, a gradient of the phase components of the individual correlation image elements R(k1, k2) reflects a position offset between the image element F(k1, k2) and the image element G(k1, k2).

Figure 19A:
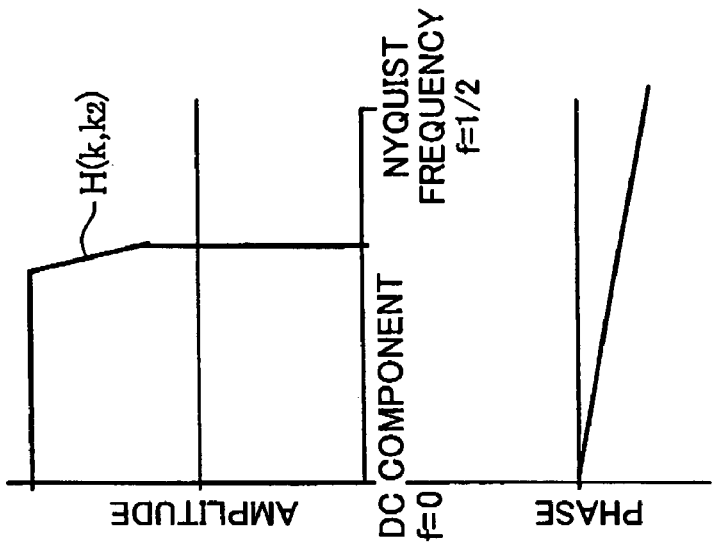
FIGS. 19A to 19C are diagrams showing a mathematical treatment for calculating correlation image elements weighted according to frequency components thereof.
Figure 19B:
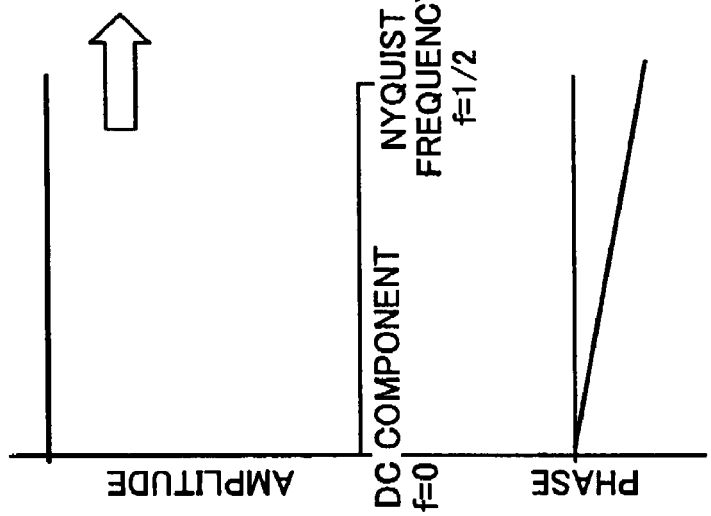
Figure 19C:
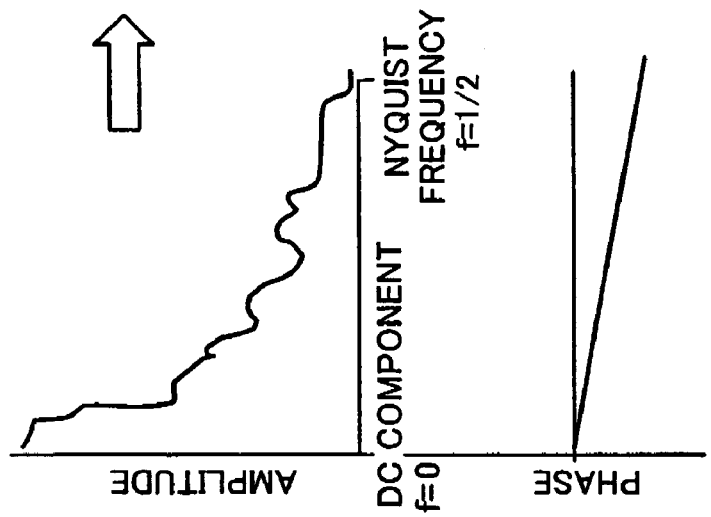

In one form of the embodiment, the phase comparator PC5 may calculate the correlation image elements R(k1, k2) by weighting the image elements according to frequency components thereof to estimate the gradient of the phase components in a robust fashion. FIGS. 19A to 19C are diagrams showing a mathematical treatment for calculating the correlation image elements R(k1, k2) weighted according to the frequency components.

First, the phase comparator PC5 multiplies the image element F(k1, k2) by the complex conjugate of the image element G(k1, k2) as shown in FIG. 19A. Next, the phase comparator PC5 normalizes values obtained by this multiplication to obtain a correlation image element R'(k1, k2) as shown in FIG. 19B. Then, the phase comparator PC5 multiplies the correlation image element R' (k1, k2) by a generally steplike weighting function H(k1, k2), for instance, to produce the correlation image element R(k1, k2) as shown in FIG. 19C.

Returning to FIG. 16, the position offset calculating unit PC6 performs an inverse discrete Fourier transformation of the correlation image element R(k1, k2) to produce a POC function r(n1, n2) and calculates the position offset of the image element in the reference window W2 from the image element in the standard window W1. The inverse discrete Fourier transformation can be performed by using equation (17) below:

$$r(n_1, n_2) = \frac{1}{N_1, N_2} \sum_{k_1, k_2} R(k_1, k_2) W_{N_1}^{-k_1, n_1} W_{N_2}^{-k_2, n_2} \quad (17)$$

where $\Sigma_{k_1, k_2}$ indicates $\Sigma_{k_1=-M_1}^{M_1} \Sigma_{k_2=-M_2}^{M_2}$, M1 indicates the distance from the central point of the standard window W1 and the reference window W2 to a corner of the pertinent window in the horizontal direction, M2 indicates the distance from the central point of the standard window W1 and the reference window W2 to the corner of the pertinent window in the vertical direction.

Figure 20:
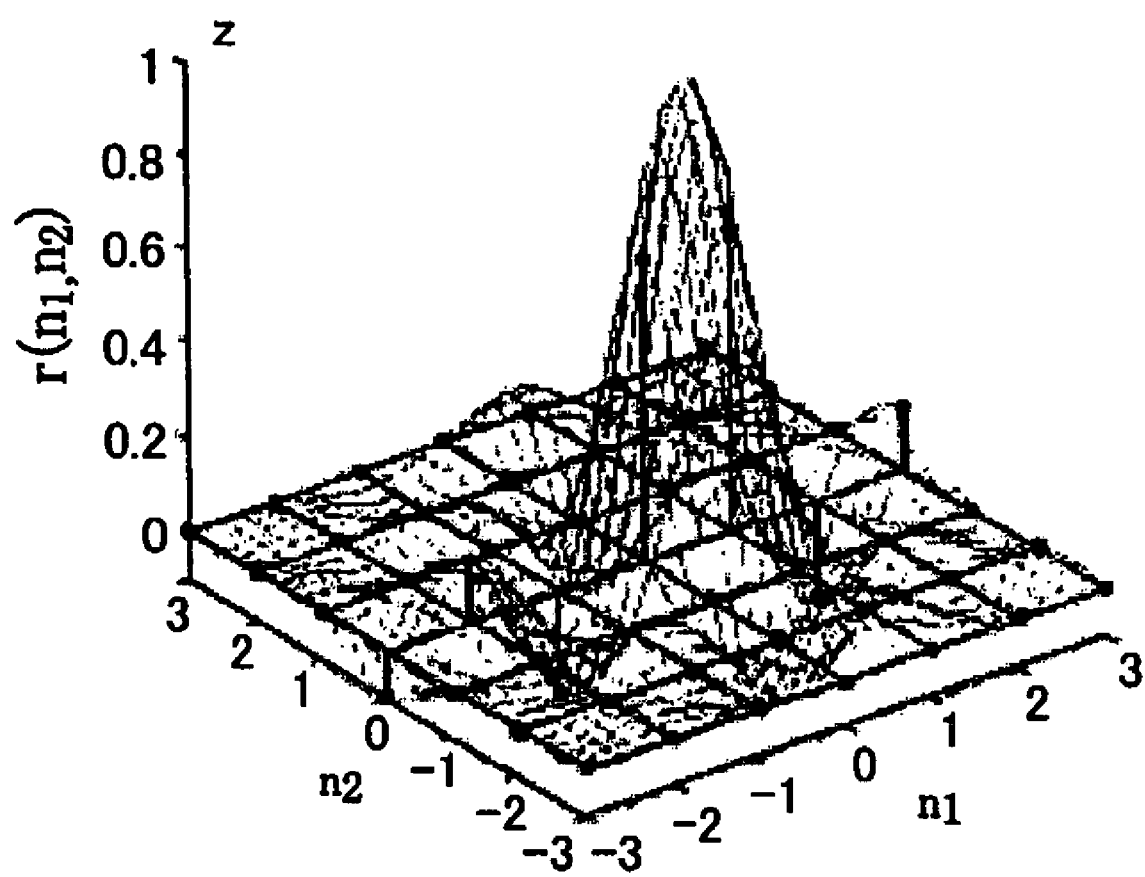
FIG. 20 is a graph showing a POC function.

FIG. 20 is a graph showing the POC function r(n1, n2), in which n1- and n2-axes indicate coordinates in the horizontal and vertical directions, respectively, and a z-axis indicates POC values with the central point of the standard window W1 located at an origin of the graph. The POC function has a sharp correlation peak as depicted in FIG. 20 and is known to exhibit high robustness and estimation accuracy in image matching. The location of this correlation peak indicates a point where the segmental image in the standard window W1 and the corresponding segmental image in the reference window W2 best match each other.

Therefore, it is possible to determine the points corresponding to the target points by identifying the location of the correlation peak and calculating the position offset of the reference window W2 from the standard window W1. Since the POC function is calculated in terms of pixels of the standard image, or with a pixel-level accuracy, the location of the correlation peak is also determined with the pixel-level accuracy. In one variation of the embodiment, the location of the correlation peak may be estimated with a sub-pixel-level accuracy by interpolating the POC function by fitting a function of a parabola to the POC function, for instance.

Returning again to FIG. 16, the corresponding point calculating unit PC7 determines the point corresponding to each target point by finding out a point located at coordinates obtained by adding the position offset calculated by the position offset calculating unit PC6 to coordinates of the central point of the reference window W2, for example.

The analyzer of the first embodiment thus far described is configured to set a plurality of target points in each input image obtained by shooting an image in a surrounding area of the moving body by the stereo camera 1 and calculate the forward moving speed v of the moving body, the angular velocity ω in the pitch direction, the angular velocity σ in the pan direction, the height h of the stereo camera 1 and the angle of inclination φ in the pitch direction based on the parallax and optical flow of each target point. This approach of the first embodiment makes it possible to analyze the motion of the moving body with high accuracy even when the moving body is slipping or otherwise moving in an irregular fashion.

While an initial value of h or the value of h obtained in step S5 in the preceding frame is used in the process of step S4, the invention is not limited to this approach. An alternative approach usable in this process would be to calculate the gradient and intercept of the straight line L1 by using ω and v·h as variables without substituting the value of h into equation (A) and, then, determine ω and v·h and calculate the forward moving speed v by using the value of h obtained in step S5, for instance It is possible to calculate the forward moving speed v of the moving body with the height h of the stereo camera 1 reflected more exactly in this way.

Second Embodiment

An analyzer according to a second embodiment of the present invention is now described. The analyzer of this embodiment is characterized in that operations performed in steps S4 to S6 differ from the operations performed in the first embodiment. The following discussion of the second embodiment focuses on aspects thereof differing from the first embodiment by omitting the description of common aspects of the two embodiments.

In this embodiment, the motion component separator 221 shown in FIG. 3 determines straight lines drawn by individual target points assuming that the target points exist on the road surface contained in an input image based on squares of parallaxes and vertical components of optical flows of the individual target points by using the forward moving speed of the moving body and the angular velocity thereof in the pitch direction as variables. The motion component separator 221 then calculates the forward moving speed of the moving body and the angular velocity thereof in the pitch direction by projecting the straight lines thus obtained onto a voting space defined by coordinate axes representing the forward moving speed and the angular velocity in the pitch direction.

The road surface parameter estimator 222 determines straight lines drawn by the individual target points assuming that the target points exist on the road surface contained in the input image based on the parallaxes and vertical components of the optical flows of the individual target points by using the height of the stereo camera 1 and the angle of inclination thereof in the pitch direction as variables. The road surface parameter estimator 222 then calculates the height of the stereo camera 1 and the angle of inclination thereof in the pitch direction by projecting the straight lines thus obtained onto a voting space defined by coordinate axes representing the height and the angle of inclination in the pitch direction of the stereo camera 1.

The motion magnitude calculator 223 determines candidate points of the angular velocity of the moving body in the pan direction for the individual target points assuming that the target points exist on the road surface contained in the input image based on first coordinate values obtained from horizontal components of optical flows, the forward moving speed, parallaxes and horizontal components of the target points and second coordinate values obtained from the forward moving speed and parallaxes. The motion magnitude calculator 223 then calculates the angular velocity of the moving body in the pan direction by projecting the candidate points thus obtained onto a one-dimensional coordinate space of which variable is the angular velocity in the pitch direction.

Now, the working of the analyzer of the second embodiment is described referring to the flowchart of FIG. 4. Operations performed in steps S1 to S3 and S7 are the same as previously discussed in the first embodiment so that a description of these steps is not provided here.

In step S4, the motion component separator 221 calculates the forward moving speed of the moving body and the angular velocity thereof in the pitch direction. Specifically, the motion component separator 221 performs this calculation process as follows. First, the motion component separator 221 substitutes the square of parallax ($d^2$) of each target point and the vertical component ($\Delta y$) of optical flow into equation (D) below to thereby determine a straight line (ω-v line) defined by variables ω and v for each target point:

$$\omega \Delta t = \frac{1}{\alpha^2} \cdot \frac{h}{B^2} d^2 \cdot v \Delta t - \frac{\Delta y}{\alpha} \quad (D)$$

Since α, B and $\Delta t$ in equation (D) are constants, it is possible to obtain the ω-v line defined by the variables ω and v by substituting $d^2$ and $\Delta y$ into equation (D) above, in which the value of h is obtained in step S5. Although h is not a constant, it is possible to employ a predetermined initial value of h or a value of h obtained in step S5 in the preceding frame.

Figure 21A:
FIGS. 21A and 21B are explanatory diagrams of a process performed in step S4 according to a second embodiment of the invention.
Figure 21B:
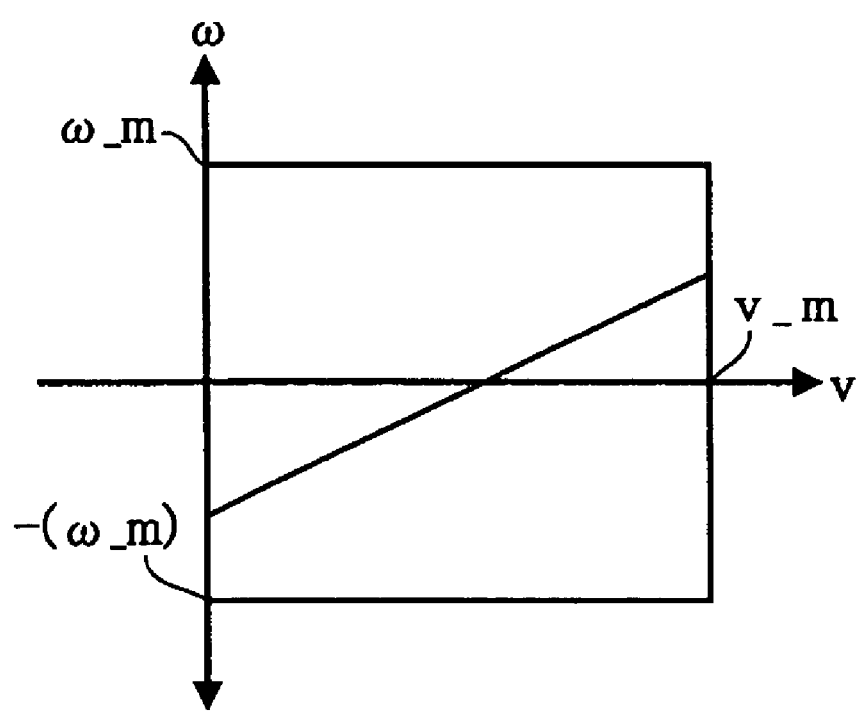

Next, the ω–v lines obtained for the individual target points are projected onto a two-dimensional coordinate space (ω-v space) defined by coordinate axes representing ω and v values. FIGS. 21A and 21B are diagrams showing the ω-v space for explaining the process performed in step S4. Referring to FIG. 21B, a rectangular area defined by ranges of 0•v•v_m and –ω_m•ω•ω_m in the ω-v space represents a voting space and it is assumed that this voting space is divided into a plurality of rectangular blocks having a particular size. For example, the rectangular area defined by the ranges of 0•v•v_m and –ω_m•ω•ω_m is divided into 50 rows and 50 columns.

Subsequently, the motion component separator 221 projects the ω-v lines onto the ω-v space to vote, or distribute, the ω-v lines to the individual blocks. Then, the motion component separator 221 finds out a block containing a maximum number of votes, that is, the block through which the largest number of ω-v lines pass, and calculates the values of ω and v in this block as the forward moving speed of the moving body and the angular velocity thereof in the pitch direction. FIG. 21A shows the ω-v lines plotted in the ω-v space, in which higher levels of brilliance indicate larger numbers of votes. Thus, the values of ω and v at a high-brilliance site in FIG. 21A are calculated as the forward moving speed of the moving body and the angular velocity thereof in the pitch direction.

It is to be pointed out that the ω-v space does not cover the entirety of the aforementioned two-dimensional coordinate space but is limited to the ranges of 0•v•v_m and −ω_m•ω•ω_m to cover the voting space which is expected to include a block containing the maximum number of votes. This approach is taken as the values of ω and v to be calculated are more or less predictable according to the type of the moving body. This approach of the embodiment makes it possible to achieve simplification of processing.

The aforementioned process of step S4 may be so modified as to adopt ω·Δt and v·Δt, instead of ω and v, to represent the angular velocity in the pitch direction and the forward moving speed of the moving body, respectively. In this case, the ω-v line is defined by variables ω·Δt and v·Δt and the vertical and horizontal axes of the ω-v space shown in FIGS. 21A and 21B represent ω·Δt and v·Δt, respectively.

Returning to FIG. 4, the road surface parameter estimator 222 calculates the road surface parameters in step S5. Specifically, the road surface parameter estimator 222 performs this calculation process as follows. First, the road surface parameter estimator 222 substitutes the parallax (d) and the vertical component (y) of each target point into equation (E) below to thereby determine a straight line (φ-h line) defined by variables φ and h for each target point:

$$\phi = \frac{d}{\alpha B} h - \frac{y}{\alpha} \quad (E)$$

Since α and B in equation (E) are constants, it is possible to obtain the φ-h line defined by the variables φ and h by substituting d and y into equation (E) above.

Figure 22A:
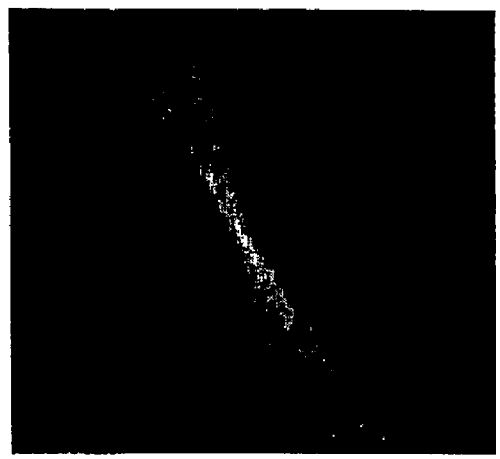
FIGS. 22A and 22B are explanatory diagrams of a process performed in step S5 according to the second embodiment.
Figure 22B:
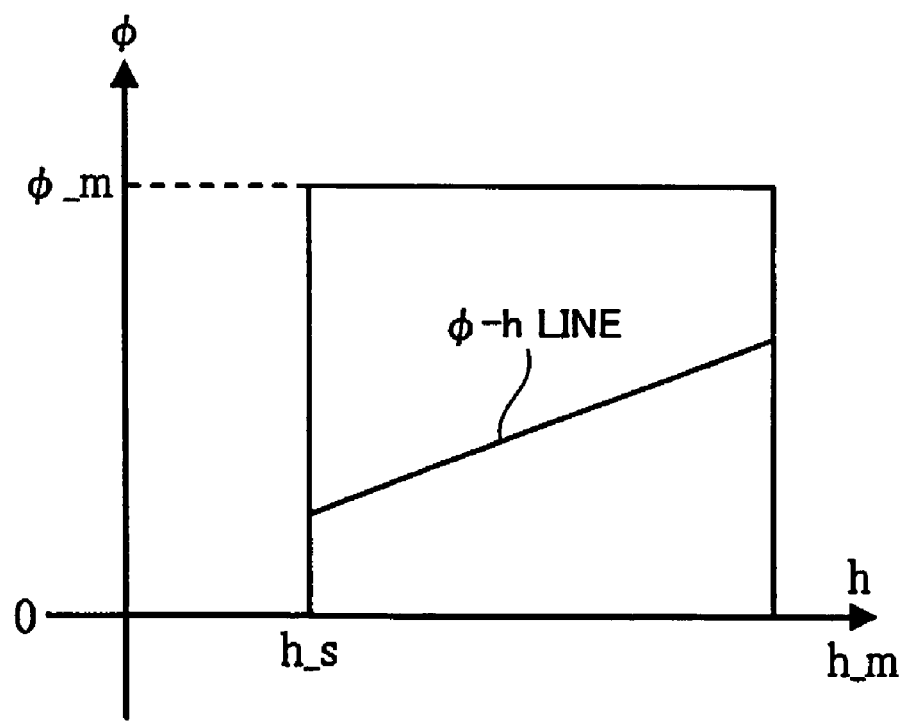

Next, the φ-h lines obtained for the individual target points are projected onto a two-dimensional coordinate space (φ-h space) defined by coordinate axes representing φ and h values. FIGS. 22A and 22B are diagrams showing the φ-h space for explaining the process performed in step S5. Referring to FIG. 22B, a rectangular area defined by ranges of 0•φ•φ_m and h_s•h•h_m in the φ-h space represents a voting space and it is assumed that this voting space is divided into a plurality of rectangular blocks having a particular size. For example, the value of φ_m is 0.1 (radian), the value of h_s is 1000 (mm), and the value of h_m is 1500 (mm). In this case, the rectangular area defined by the ranges of 0•φ•φ_m and h_s•h•h_m is divided into 50 rows and 50 columns.

Subsequently, the road surface parameter estimator 222 projects the φ-h lines onto the φ-h space to vote, or distribute, the φ-h lines to the individual blocks Then, the road surface parameter estimator 222 finds out a block containing a maximum number of votes, that is, the block through which the largest number of φ-h lines pass, and calculates the values of φ and h in this block as the angle of inclination of the moving body in the pitch direction and the height of the stereo camera 1. FIG. 22A shows the φ-h lines plotted in the φ-h space, in which higher levels of brilliance indicate larger numbers of votes. Thus, the values of φ and h at a high-brilliance site in FIG. 22A are calculated as the angle of inclination in the pitch direction and the height of the stereo camera 1.

It is to be pointed out that the φ-h space does not cover the entirety of the aforementioned two-dimensional coordinate space but is limited to the ranges of 0•φ•φ_m and h_s•h•h_m to cover the voting space which is expected to include a block containing the maximum number of votes. This approach is taken as the values of φ and h to be calculated are more or less predictable according to the type of the moving body. This approach of the embodiment makes it possible to achieve simplification of processing.

Returning again to FIG. 4, the motion magnitude calculator 223 calculates the angular velocity of the moving body in the pan direction in step S6. Specifically, the motion magnitude calculator 223 performs this calculation process as follows. First, the motion magnitude calculator 223 determines the first and second coordinate values of each target point. Since the process for calculating the first and second coordinate values is the same as previously discussed in step S6 of the first embodiment, a further description of this process is not provided here.

Then, the motion magnitude calculator 223 determines the candidate points of the angular velocity σ of the moving body by substituting the first and second coordinate values into equation (F) below:

$$\sigma \Delta t = -\left(\Delta x - \frac{1}{\alpha} \cdot \frac{v \Delta t}{1} \cdot \frac{1}{B} d \cdot x\right) \Big/ \left(\alpha + \frac{v \Delta t}{2} \cdot \frac{1}{B} d\right) \quad (F)$$

Figure 23A:
FIGS. 23A and 23B are explanatory diagrams of a process performed in step S6 according to the second embodiment.
Figure 23B:
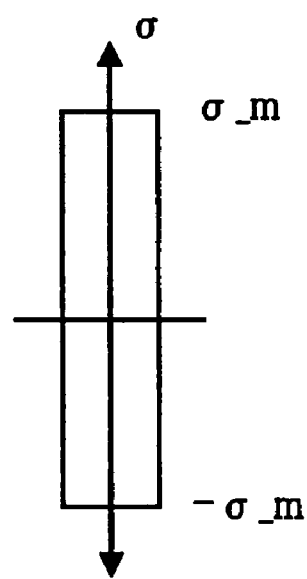

Next, the motion magnitude calculator 223 projects the candidate points obtained for the individual target points onto a one-dimensional coordinate space (σ space) defined by a coordinate axis representing the angular velocity σ of the moving body in the pan direction to vote, or distribute, the candidate points to individual blocks. FIGS. 23A and 23B are diagrams showing the σ space for explaining the process performed in step S6. Referring to FIG. 23B, an area defined by a range of −σ_m•σ•σ_m represents a voting space and it is assumed that this voting space is divided into a plurality of linear blocks having a particular size. For example, the area defined by the range of −σ_m•σ•σ_m is divided into 50 rows and 50 columns.

Then, the motion magnitude calculator 223 finds out a block containing a maximum number of votes and calculates the value of σ in this block as the angular velocity of the moving body in the pan direction. FIG. 23A shows the candidate points plotted in the σ space, in which higher levels of brilliance indicate larger numbers of votes. Thus, the value of σ at a high-brilliance site in FIG. 23A is calculated as the angular velocity of the moving body in the pan direction. As depicted FIG. 23A, the value of σ is approximately 0, indicating that the moving body is moving in the forward moving direction.

It is to be pointed out that the σ space does not cover the entirety of the aforementioned one-dimensional coordinate space but is limited to the range of −σ_m•σ•σ_m to cover the voting space which is expected to include a block containing the maximum number of votes. This approach is taken as the value of σ to be calculated is more or less predictable according to the type of the moving body. This approach of the embodiment makes it possible to achieve simplification of processing.

The analyzer of the second embodiment thus far described is configured to calculate various kinds of parameters by a process of voting onto the relevant voting space. This approach of the second embodiment makes it possible to analyze the motion of the moving body with high accuracy. While an initial value of h or the value of h obtained in step S5 in the preceding frame is used in the process of step S4 in this second embodiment, the invention is not limited to this approach. An alternative approach usable in this process would be to determine ω-v·h lines defined by variables ω and v·h for the individual target points without substituting the value of h into equation (D) and, then, calculate ω and v·h by plotting the ω-v·h lines in a two-dimensional coordinate space defined by coordinate axes representing ω and v·h. The forward moving speed v of the moving body may be then calculated by using the value of h obtained in step S5. It is possible to calculate the forward moving speed v of the moving body with the height h of the stereo camera 1 reflected more exactly in this way.

If the stereo camera 1 used in the second embodiment is of a rolling shutter type, the value of h obtained in step S5 and the value of ϕ may be corrected in the same way as in the first embodiment.

While the analyzers of the first and second embodiments analyze the motion of the moving body using parallaxes calculated by a stereo method, the invention is not limited thereto but may employ a technique of analyzing the motion of the moving body based on three-dimensional positions of the individual target points calculated by using a three-dimensional position measuring apparatus like a laser range finder.

Also, the stereo camera 1 may be of a type including three or more cameras. In this alternative, the analyzer may be configured such that one of the cameras captures a standard image and the other cameras capture reference images and the analyzer finds out points in the reference images corresponding to individual target points set in the standard image and calculates parallaxes of the individual target points.

In summary, an inventive analyzer configured to be installed on a moving body for analyzing motion of the moving body comprises an image pickup device for capturing images in a surrounding area of the moving body, an information calculation unit for setting a plurality of target points in each input image captured by the image pickup device and calculating three-dimensional information on the individual target points and two-dimensional optical flows thereof, and a movement calculation unit for calculating information on at least one of a forward moving speed and a turning speed of the moving body based on the three-dimensional information and the optical flows calculated by the information calculation unit.

The analyzer is configured to set a plurality of target points in each input image obtained by shooting an image in a surrounding area of the moving body by the image pickup device and calculate the information on the forward moving speed and/or the turning speed of the moving body based on the three-dimensional information on the individual target points and the optical flows thereof. Since the analyzer separately calculates the forward moving speed and/or the turning speed of the moving body, the analyzer can analyze the motion of the moving body with high accuracy.

The analyzer may be preferably configured such that the three-dimensional information is parallaxes, the image pickup device is a stereo camera, and the information calculation unit calculates the parallaxes by using a stereo method.

This configuration is advantageous in that the information calculation unit can calculate the optical flows and the parallaxes from the same input images.

The analyzer may be preferably configured such that the information on the turning speed indicates angular velocity of the moving body in a pitch direction, and the movement calculation unit includes a first calculator which determines a straight line representing a group of target points located on a characteristic surface contained in the input images by plotting the individual target points in a two-dimensional coordinate space defined by coordinate axes representing squares of the parallaxes and vertical components of the optical flows of the target points and calculates the forward moving speed of the moving body based on the gradient of the straight line and/or the angular velocity of the moving body in the pitch direction based on the intercept of the straight line.

According to this configuration, the movement calculation unit determines the straight line representing a group of target points located on the characteristic surface contained in the input images by plotting the individual target points in the two-dimensional coordinate space defined by the coordinate axes representing the squares of the parallaxes and the vertical components of the optical flows of the target points and calculates the forward moving speed of the moving body based on the gradient of the straight line and/or the angular velocity of the moving body in the pitch direction based on the intercept of the straight line. This approach makes it possible to determine the forward moving speed of the moving body and/or the angular velocity thereof in the pitch direction high accuracy. Also, since the movement calculation unit determines the straight line representing a group of target points located on the characteristic surface, such as the road surface, contained in the input images, it is possible to extracts the target points located on the characteristic surface.

The analyzer may be preferably configured such that the information on the turning speed indicates angular velocity of the moving body in a pitch direction, and the movement calculation unit includes a first calculator which determines straight lines drawn by the individual target points assuming that the target points exist on a characteristic surface contained in the input images based on squares of the parallaxes and vertical components of the optical flows of the target points by using the forward moving speed of the moving body and the angular velocity thereof in the pitch direction as variables and calculates the forward moving speed of the moving body and/or the angular velocity thereof in the pitch direction by projecting the straight lines thus obtained onto a voting space defined by coordinate axes representing the forward moving speed and the angular velocity in the pitch direction.

According to this configuration, the movement calculation unit determines the straight lines drawn by the individual target points assuming that the target points exist on the characteristic surface contained in the input images and calculates the forward moving speed of the moving body and/or the angular velocity thereof in the pitch direction by projecting the straight lines onto the voting space which is a two-dimensional coordinate space defined by the coordinate axes representing the forward moving speed and the angular velocity in the pitch direction. This approach makes it possible to calculate the information on the turning speed and/or the angular velocity of the moving body in the pitch direction in a robust fashion without any influence of noise.

The analyzer may be preferably configured such that the movement calculation unit further includes a second calculator which determines the straight line representing the group of target points located on the characteristic surface contained in the input images by plotting the individual target points in a two-dimensional coordinate space defined by coordinate axes representing the parallaxes and vertical components of the target points and calculates the height of the image pickup device from the characteristic surface based on the gradient of the straight line and/or the angle of inclination of the image pickup device in the pitch direction relative to the characteristic surface based on the intercept of the straight line.

The analyzer thus configured can exactly estimate the attitude of the image pickup device by calculating the height and/or the angle of inclination of the image pickup device with high accuracy.

The analyzer may be preferably configured such that the movement calculation unit further includes a second calculator which determines the straight lines drawn by the individual target points assuming that the target points exist on the characteristic surface contained in the input images based on the parallaxes and vertical components of the optical flows of the individual target points by using the height of the image pickup device from the characteristic surface and the angle of inclination thereof in the pitch direction as variables and calculates the height of the image pickup device and/or the angle of inclination of the moving body in the pitch direction by projecting the straight lines thus obtained onto a voting space defined by coordinate axes representing the height of the image pickup device and the angle of inclination thereof in the pitch direction.

According to this configuration, the movement calculation unit determines the straight lines drawn by individual target points assuming that the target points exist on the characteristic surface contained in the input images and calculates the height and/or the angle of inclination of the image pickup device by projecting the straight lines thus obtained onto the voting space which is a two-dimensional coordinate space defined by the coordinate axes representing the height and the angle of inclination of the image pickup device. This approach makes it possible to estimate the attitude of the image pickup device in a robust fashion without any influence of noise.

The analyzer may be preferably configured such that the image pickup device is of a rolling shutter type, and the second calculator corrects the angle of inclination of the image pickup device in the pitch direction based on exposure time per horizontal scanning line of the image pickup device and/or the angular velocity of the moving body in the pitch direction calculated by the first calculator.

According to this configuration, it is possible to calculate the height and/or the angle of inclination of the image pickup device even if the image pickup device is of a low-cost rolling shutter type.

The analyzer may be preferably configured such that the movement calculation unit further includes a third calculator which determines the straight line representing the group of target points located on the characteristic surface contained in the input images by plotting the individual target points in a two-dimensional coordinate space defined by first coordinate values obtained from horizontal components of the optical flows, the forward moving speed, the parallaxes and horizontal components of the target points and second coordinate values obtained from the forward moving speed and the parallaxes and calculates angular velocity of the moving body in a pan direction based on the gradient of the straight line.

The analyzer thus configured can calculate the angular velocity of the moving body in the pan direction with high accuracy.

The analyzer may be preferably configured such that the movement calculation unit further includes a third calculator which determines candidate points of angular velocity of the moving body in a pan direction for the individual target points assuming that the target points exist on the characteristic surface contained in the input images based on first coordinate values obtained from horizontal components of the optical flows, the forward moving speed, the parallaxes and horizontal components of the target points and second coordinate values obtained from the forward moving speed and parallaxes and calculates the angular velocity of the moving body in the pan direction based on the candidate points thus obtained.

According to this configuration, the movement calculation unit determines the candidate points of the angular velocity of the moving body in the pan direction for the individual target points assuming that the target points exist on the characteristic surface contained in the input images and calculates the angular velocity of the moving body in the pan direction by projecting the candidate points thus obtained onto the voting space which is a one-dimensional coordinate space defined by a coordinate axis representing estimated values of the angular velocity in the pan direction obtained from the first and second coordinate values. This approach makes it possible to estimate the attitude of the image pickup device in a robust fashion without any influence of noise.

The analyzer may be preferably configured to further comprise an annunciator for providing motion information related to the motion of the moving body by presenting a directional symbol having a length corresponding to the forward moving speed calculated by the movement calculation unit and a direction indicated by the information on the turning speed.

According to this configuration, the annunciator (display unit) presents a directional symbol having a length corresponding to the forward moving speed and a direction indicated by the information on the turning speed, so that a vehicle occupant can easily recognize information concerning the motion of the moving body.

The analyzer may be preferably configured such that the information calculation unit selects one of a plurality of input images captured by the image pickup device for subsequent processing as a standard image, sets a window in the standard image at a location therein relative to a target point set in the standard image, sets a window in each of the other input images to be processed, decomposes segmental images in the set windows into frequency components, and searches for a point corresponding to the target point based on a correlation between signals of which amplitude components are suppressed to thereby calculate the optical flows and the three-dimensional information.

According to this configuration, the information calculation unit searches for a point corresponding to each target point based on a correlation between signals of which amplitude components are suppressed. This approach makes it possible to calculate parallaxes in a robust fashion without any influence of a difference in sensitivity of paired stereo images and determine points corresponding to the target points set even on a road surface in a stable fashion.

The analyzer may be preferably configured such that the information calculation unit determines the corresponding point by the phase-only correlation method.

This configuration is advantageous in that the information calculation unit can search for the corresponding point in a robust fashion.

As this invention may be embodied in several forms without departing from the spirit of essential characteristics thereof, the present embodiment is therefore illustrative and not restrictive, since the scope of the invention is defined by the appended claims rather than by the description preceding

What is claimed is:

1. An analyzer configured to be installed on a moving body for analyzing motion of the moving body, said analyzer comprising:
   an image pickup device comprising a stereo camera for capturing images in a surrounding area of the moving body;
   an information calculation unit for setting a plurality of target points in each input image captured by said image pickup device and calculating parallaxes on the plurality of target points by using a stereo method and two-dimensional optical flows thereof; and
   a movement calculation unit for calculating information on at least one of a forward moving speed and a turning speed of the moving body based on the parallaxes and the optical flows, by plotting the target points in a two-dimensional coordinate space defined by coordinate axes relating to parallaxes and components of optical flows, and determining a straight line defined by the plotted target points.

2. The analyzer according to claim 1, wherein said movement calculation unit includes a first calculator which determines a first straight line representing a first group of target points located on a characteristic surface contained in the input images by plotting the plurality of target points in a two-dimensional coordinate space defined by coordinate axes representing squares of the parallaxes and vertical components of the optical flows of the target points; and
   the first calculator calculates the forward moving speed of the moving body based on the gradient of the first straight line.

3. The analyzer according to claim 2, wherein said movement calculation unit further includes a second calculator which determines a second straight line representing a second group of target points located on the characteristic surface contained in the input images by plotting the plurality of target points in a two-dimensional coordinate space defined by coordinate axes representing the parallaxes and vertical components of the target points; and
   the second calculator calculates the height of said image pickup device from the characteristic surface based on the gradient of the second straight line.

4. The analyzer according to claim 1, wherein the information on the turning speed indicates angular velocity of the moving body in a pitch direction, and
   said movement calculation unit includes a first calculator which determines a first straight line representing a first group of target points located on a characteristic surface contained in the input images by plotting the plurality of target points in a two-dimensional coordinate space defined by coordinate axes representing squares of the parallaxes and vertical components of the optical flows of the target points; and
   the first calculator calculates the angular velocity of the moving body in the pitch direction based on the intercept of the first straight line.

5. The analyzer according to claim 4, wherein said movement calculation unit further includes a second calculator which determines a second straight line representing a second group of target points located on the characteristic surface contained in the input images by plotting the plurality of target points in a two-dimensional coordinate space defined by coordinate axes representing the parallaxes and vertical components of the target points; and
   the second calculator calculates the angle of inclination of said image pickup device in the pitch direction relative to the characteristic surface based on the intercept of the straight line.

6. The analyzer according to claim 1, wherein the information on the turning speed indicates angular velocity of the moving body in a pitch direction, and said movement calculation unit includes a first calculator which determines a first straight line representing a first group of target points located on a characteristic surface contained in the input images by plotting the plurality of target points in a two-dimensional coordinate space defined by coordinate axes representing squares of the parallaxes and vertical components of the optical flows of the target points; and
   the first calculator calculates the forward moving speed of the moving body based on the gradient of the first straight line as well as the angular velocity of the moving body in the pitch direction based on the intercept of the first straight line.

7. The analyzer according to claim 6, wherein said movement calculation unit further includes a second calculator which determines a second straight line representing a second group of target points located on the characteristic surface contained in the input images by plotting the plurality target points in a two-dimensional coordinate space defined by coordinate axes representing the parallaxes and vertical components of the target points; and
   the second calculator calculates the height of said image pickup devices from the characteristic surface based on the gradient of the second straight line as well as angle of inclination of said image pickup device in the pitch direction relative to the characteristic surface based on the intercept of the second straight line.

8. The analyzer according to claim 7, wherein said image pickup device is of a rolling shutter type, and said image pickup device in the pitch direction based on exposure time per horizontal scanning line of said image pickup device and angular velocity of the moving body in the pitch direction is calculated by said first calculator.

9. The analyzer according to claim 7, wherein said movement calculation unit further includes a third calculator which determines a third straight line representing a third group of target points located on the characteristic surface contained in the input images by plotting the plurality target points in a two-dimensional coordinate space defined by first coordinate values obtained from horizontal components of the optical flows, the forward moving speed, the parallaxes and horizontal components of the target points, and second coordinate values obtained from the forward moving speed and the parallaxes; and
   the third calculator calculates angular velocity of the moving body in a pan direction based on the gradient of the third straight line.

10. The analyzer according to claim 1, wherein the information on the turning speed indicates angular velocity of the moving body in a pitch direction, and
    wherein said movement calculation unit includes a first calculator which determines a first set of straight lines drawn by the plurality of target points assuming that the target points exist on a characteristic surface contained in the input images based on squares of the parallaxes and vertical components of the optical flows of the target points by using the forward moving speed of the moving body and angular velocity thereof in the pitch direction as variables; and
    the first calculator calculates the forward moving speed of the moving body by projecting the first set of straight lines thus obtained onto a voting space defined by coordinate axes representing the forward moving speed and angular velocity in the pitch direction.

11. The analyzer according to claim 10, wherein said movement calculation unit further includes a second calculator which determines a second set of straight lines drawn by the plurality of target points assuming that the target points exist on the characteristic surface contained in the input images based on the parallaxes and vertical components of the optical flows by the plurality target points by using the height of said image pickup device from the characteristic surface and an angle of inclination thereof in the pitch direction as variables; and the second calculator calculates the height of said image pickup device by projecting the second set of straight lines thus obtained onto a voting space defined by coordinate axes representing the height of said image pickup device and angle of inclination thereof in the pitch direction.

12. The analyzer according to claim 1, wherein the information on the turning speed indicates angular velocity of the moving body in a pitch direction, and said movement calculation unit includes a first calculator which determines a first set of straight lines drawn by the plurality target points assuming that the target points exist on a characteristic surface contained in the input images based on squares of the parallaxes and vertical components of the optical flows of the target points by using the forward moving speed of the moving body and angular velocity thereof in the pitch direction as variables; and the first calculator calculates angular velocity of the moving body in the pitch direction by projecting the first set of straight lines thus obtained onto a voting space defined by coordinate axes representing the forward moving speed and angular velocity in the pitch direction.

13. The analyzer according to claim 12, wherein said movement calculation unit further includes a second calculator which determines a second set of straight lines drawn by the plurality of target points assuming that the target points exist on the characteristic surface contained in the input images based on the parallaxes and vertical components of the optical flows of the plurality of target points by using the height of said image pickup device from the characteristic surface and angle of inclination thereof in the pitch direction as variables; and the second calculator calculates angle of inclination of the moving body in the pitch direction by projecting the second set of straight lines thus obtained onto a voting space defined by coordinate axes representing the height of said image pickup device and angle of inclination thereof in the pitch direction.

14. The analyzer according to claim 1, wherein the information on the turning speed indicates angular velocity of the moving body in a pitch direction, and said movement calculation unit includes a first calculator which determines a first set of straight lines drawn by the plurality of target points assuming that the target points exist on a characteristic surface contained in the input images based on squares of the parallaxes and vertical components of the optical flows of the target points by using the forward moving speed of the moving body and angular velocity thereof in the pitch direction as variables; and the second calculator calculates the forward moving speed of the moving body and the angular velocity thereof in the pitch direction by projecting the second set of straight lines thus obtained onto a voting space defined by coordinate axes representing the forward moving speed and angular velocity in the pitch direction.

15. The analyzer according to claim 14, wherein said movement calculation unit further includes a second calculator which determines a second set of straight lines drawn by the plurality of target points assuming that the target points exist on the characteristic surface contained in the input images based on the parallaxes and vertical components of the optical flows of the plurality of target points by using the height of said image pickup device from the characteristic surface and angle of inclination thereof in the pitch direction as variables; and the second calculator calculates the height of said image pickup device and angle of inclination of the moving body in the pitch direction by projecting the second set of straight lines thus obtained onto a voting space defined by coordinate axes representing the height of said image pickup device and angle of inclination thereof in the pitch direction.

16. The analyzer according to claim 15, wherein said image pickup device is of a rolling shutter type, and said second calculator corrects angle of inclination of said image pickup device in the pitch direction based on exposure time per horizontal scanning line of said image pickup device and angular velocity of the moving body in the pitch direction calculated by said first calculator.

17. The analyzer according to claim 15, wherein said movement calculation unit further includes a third calculator which determines candidate points of angular velocity of the moving body in a pan direction for the plurality of target points assuming that the target points exist on the characteristic surface contained in the input images based on first coordinate values obtained from horizontal components of the optical flows, the forward moving speed, the parallaxes and horizontal components of the target points and second coordinate values obtained from the forward moving speed and parallaxes and calculates angular velocity of the moving body in the pan direction based on the candidate points thus obtained.

18. The analyzer according to claim 1, further comprising an annunciator for providing motion information related to the motion of the moving body by presenting a directional symbol having a length corresponding to the forward moving speed calculated by said movement calculation unit and a direction indicated by the information on the turning speed.

19. The analyzer according to claim 1, wherein said information calculation unit selects one of the images captured by said image pickup device for subsequent processing as a standard image, sets a window in the standard image at a location therein relative to a target point set in the standard image, sets a window in each of the other input images to be processed, decomposes segmental images in the set windows into frequency components, and searches for a point corresponding to the target point based on a correlation between signals of which amplitude components are suppressed to thereby calculate the optical flows and the parallaxes.

20. The analyzer according to claim 19, wherein said information calculation unit determines the corresponding point by the phase-only correlation method.

* * * * *